United States Patent
Xue et al.

(10) Patent No.: US 11,368,875 B1
(45) Date of Patent: Jun. 21, 2022

(54) DYNAMIC GROUP COMMON PHYSICAL CONTROL CHANNEL ASSIGNMENT TECHNIQUES

(71) Applicant: QUALCOMM Incorporated, San Diego, CA (US)

(72) Inventors: Yisheng Xue, San Diego, CA (US); Rajat Prakash, San Diego, CA (US); Jing Sun, San Diego, CA (US); Xiaoxia Zhang, San Diego, CA (US); Chih-Hao Liu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 22 days.

(21) Appl. No.: 17/110,521

(22) Filed: Dec. 3, 2020

(51) Int. Cl.
| | |
|---|---|
| *H04W 28/06* | (2009.01) |
| *H04W 72/04* | (2009.01) |
| *H04W 8/18* | (2009.01) |
| *H04L 5/00* | (2006.01) |
| *H04W 72/12* | (2009.01) |

(52) U.S. Cl.
CPC ............. *H04W 28/06* (2013.01); *H04L 5/005* (2013.01); *H04L 5/0053* (2013.01); *H04W 8/18* (2013.01); *H04W 72/042* (2013.01); *H04W 72/121* (2013.01)

(58) Field of Classification Search
CPC ..... H04W 28/06; H04W 8/18; H04W 72/042; H04W 72/121; H04L 5/005; H04L 5/0053
See application file for complete search history.

(56) References Cited

U.S. PATENT DOCUMENTS 10,979,188 B2 * 4/2021 Gong .................... H04L 5/0007

* cited by examiner

*Primary Examiner* — Ronald B Abelson
(74) *Attorney, Agent, or Firm* — Holland & Hart LLP

(57) ABSTRACT

Methods, systems, and devices for wireless communications are described. Some wireless communications systems may support improved assignment techniques for dynamic group common physical control channels. In some cases, a user equipment (UE) may receive a control message via a group common control channel. The control message may be monitored by a plurality of UEs, and the control message may include one or more control information segments for a set of UEs of the plurality. The control message may include one or more integer values associated with respective control information segments and a prime number. The integer values and the prime number may be configured to address each UE of the set of UEs. The UE may process the prime number, the integer values, and an integer value that corresponds to an identifier (ID) of the UE to determine applicability of the control message to the UE.

30 Claims, 16 Drawing Sheets

DYNAMIC GROUP COMMON PHYSICAL CONTROL CHANNEL ASSIGNMENT TECHNIQUES

FIELD OF TECHNOLOGY

The following relates to wireless communication, including dynamic group common physical control channel assignment techniques.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, the number of UEs that may be addressed in a given message (e.g., control channel message) may be limited due to a number of bits used for addressing the UEs. Some systems may address a relatively low number of UEs with a given message. In some cases, the system may be associated with a group of UEs that includes a relatively large number of UEs, and the number of bits used for addressing may be high. When the system attempts to send control information to the group of UEs, the system may have to send multiple messages, where each message is addressed to different subgroups of UEs from the group of UEs.

SUMMARY

The described techniques relate to improved methods, systems, devices, and apparatuses that support dynamic group common physical control channel assignment techniques. Generally, the described techniques provide for a user equipment (UE) to determine applicability of a control message to the UE based on addressing information in the control message. In some cases, a base station may transmit a control message via a group common control channel, such as a group common physical downlink control channel (GC-PDCCH). The control message may be monitored by a group of UEs, and the control message may include one or more control information segments that are addressed to a set of target UEs from the group of UEs monitoring for the control message. The control message may have various fields that include one or more integer values associated with respective control information segments and a prime number. Each UE that receives the control message may process the prime number, the integer values, and an integer value that corresponds to an identifier (ID) of the UE (e.g., a radio network temporary identifier (RNTI) of the UE). The UE may determine applicability of the control message to the UE based on the processing. If the UE determines that the control message includes control information addressed to the UE, the UE may decode the respective control information. If the UE determines that the control message does not include control information addressed to the UE, the UE may refrain from decoding the control information in the control message. The integer values and the prime number may be configured to address each UE of the set of UEs using relatively fewer bits (e.g., as compared to other addressing techniques). For example, the integer values and the prime number may address the target UEs using fewer bits than techniques that rely on the control message including an ID of each target UE.

A method for wireless communication by a UE is described. The method may include receiving a control message via a group common control channel, the control message including a set of multiple control information segments for a set of UEs from a set of multiple UEs, identifying, within the control message, a prime number and a set of multiple integer values, each integer value of the set of multiple integer values being associated with respective control information segments of the set of multiple control information segments, and processing the prime number, each integer value of the set of multiple integer values, and a first integer value corresponding to an ID of the UE to determine applicability of the control message to the UE.

An apparatus for wireless communication by a UE is described. The apparatus may include a processor, memory in electronic communication with the processor, and instructions stored in the memory. The instructions may be executable by the processor to cause the apparatus to receive a control message via a group common control channel, the control message including a set of multiple control information segments for a set of UEs from a set of multiple UEs, identify, within the control message, a prime number and a set of multiple integer values, each integer value of the set of multiple integer values being associated with respective control information segments of the set of multiple control information segments, and process the prime number, each integer value of the set of multiple integer values, and a first integer value corresponding to an ID of the UE to determine applicability of the control message to the UE.

Another apparatus for wireless communication by a UE is described. The apparatus may include means for receiving a control message via a group common control channel, the control message including a set of multiple control information segments for a set of UEs from a set of multiple UEs, means for identifying, within the control message, a prime number and a set of multiple integer values, each integer value of the set of multiple integer values being associated with respective control information segments of the set of multiple control information segments, and means for processing the prime number, each integer value of the set of multiple integer values, and a first integer value corresponding to an ID of the UE to determine applicability of the control message to the UE.

A non-transitory computer-readable medium storing code for wireless communication by a UE is described. The code may include instructions executable by a processor to receive a control message via a group common control channel, the control message including a set of multiple control information segments for a set of UEs from a set of multiple UEs, identify, within the control message, a prime number and a set of multiple integer values, each integer value of the set of multiple integer values being associated with respective control information segments of the set of multiple control information segments, and process the prime number, each integer value of the set of multiple integer values, and a first integer value corresponding to an ID of the UE to determine applicability of the control message to the UE.

In some examples of the method, apparatuses, and non-transitory computer-readable medium described herein, processing the prime number, each integer value, and the first integer value may include operations, features, means, or instructions for calculating a remainder value using a modulo operation that includes the prime number and the first integer value corresponding to the ID of the UE and comparing the remainder value with each integer value of the set of multiple integer values, where the comparison indicates the applicability of the control message to the UE.

Some examples of the method, apparatuses, and non-transitory computer-readable medium described herein may further include operations, features, means, or instructions for determining that a first control information segment of the set of multiple control information segments may be addressed to the UE based on the remainder value being the same as an integer value of the set of multiple integer values, where the integer value may be associated with the first control information segment and decoding control information from the first control information segment based on determining that the first control information segment may be addressed to the UE.

Some examples of the method, apparatuses, and non-transitory computer-readable medium described herein may further include operations, features, means, or instructions for transmitting a message based on decoding the control information, where the message includes a retransmission of data from the UE.

Some examples of the method, apparatuses, and non-transitory computer-readable medium described herein may further include operations, features, means, or instructions for determining that the set of multiple control information segments may not be addressed to the UE based on the remainder value being different from each integer value of the set of multiple integer values and refraining from decoding control information of the set of multiple control information segments based on determining that the set of multiple control information segments may not be addressed to the UE.

Some examples of the method, apparatuses, and non-transitory computer-readable medium described herein may further include operations, features, means, or instructions for identifying one or more flag bits included in the control message, the one or more flag bits indicating a format of a payload of the control message.

In some examples of the method, apparatuses, and non-transitory computer-readable medium described herein, the one or more flag bits indicate a number of control information segments of the set of multiple control information segments, a number of bits associated with the prime number, a number of bits associated with each integer value of the set of multiple integer values, or any combination thereof. In some examples of the method, apparatuses, and non-transitory computer-readable medium described herein, different values of the one or more flag bits indicate different numbers of total bits associated with the control message.

In some examples of the method, apparatuses, and non-transitory computer-readable medium described herein, the number of bits associated with each integer value may be based on the number of bits associated with the prime number.

In some examples of the method, apparatuses, and non-transitory computer-readable medium described herein, the prime number includes an index of the prime number in a prime number sequence.

In some examples of the method, apparatuses, and non-transitory computer-readable medium described herein, the index of the prime number may be from a pre-configured table including a set of multiple prime number indices.

In some examples of the method, apparatuses, and non-transitory computer-readable medium described herein, a number of bits associated with the index of the prime number may be less than a number of bits associated with the prime number.

In some examples of the method, apparatuses, and non-transitory computer-readable medium described herein, the prime number sequence excludes one or more prime numbers that satisfy a threshold.

Some examples of the method, apparatuses, and non-transitory computer-readable medium described herein may further include operations, features, means, or instructions for determining a format for decoding the control message, where the format may be from a set of two or more predefined formats.

In some examples of the method, apparatuses, and non-transitory computer-readable medium described herein, determining the format used for encoding the control message may include operations, features, means, or instructions for performing blind decoding of the control message to determine which format of the set of two or more predefined formats may be the format used for encoding the control message.

In some examples of the method, apparatuses, and non-transitory computer-readable medium described herein, the set of two or more predefined formats includes a first format corresponding to the control message having a first bit length, a second format corresponding to the control message having a second bit length greater than the first bit length, a third format corresponding to the control message having a first scrambling sequence, a fourth format corresponding to the control message having a second scrambling sequence different from the first scrambling sequence.

Some examples of the method, apparatuses, and non-transitory computer-readable medium described herein may further include operations, features, means, or instructions for receiving a configuration of the group common control channel and identifying a hashing function based on the received configuration. Some examples of the method, apparatuses, and non-transitory computer-readable medium described herein may further include operations, features, means, or instructions for calculating the first integer value corresponding to the ID of the UE using the hashing function on a non-integer value that includes the ID of the UE.

In some examples of the method, apparatuses, and non-transitory computer-readable medium described herein, the non-integer value includes a medium access control (MAC) address, or an international mobile subscriber identity (IMSI), or any combination thereof.

In some examples of the method, apparatuses, and non-transitory computer-readable medium described herein, the first integer value corresponding to the ID of the UE includes a radio network temporary identifier (RNTI).

In some examples of the method, apparatuses, and non-transitory computer-readable medium described herein, each control information segment of the set of multiple control information segments includes a preconfigured number of bits of control information.

A method for wireless communication by a base station is described. The method may include generating a control message for a set of UEs from a set of multiple UEs, the control message including a set of multiple control information segments, selecting a set of multiple integer values and a prime number for inclusion in the control message based on the set of UEs, each integer value of the set of multiple integer values being associated with respective control information segments of the set of multiple control information segments, where the set of multiple integer values and the prime number are configured to address each UE of the set of UEs, and transmitting, to at least the set of UEs, the control message including the set of multiple integer values and the prime number, the control message transmitted via a group common control channel.

An apparatus for wireless communication by a base station is described. The apparatus may include a processor, memory in electronic communication with the processor, and instructions stored in the memory. The instructions may be executable by the processor to cause the apparatus to generate a control message for a set of UEs from a set of multiple UEs, the control message including a set of multiple control information segments, select a set of multiple integer values and a prime number for inclusion in the control message based on the set of UEs, each integer value of the set of multiple integer values being associated with respective control information segments of the set of multiple control information segments, where the set of multiple integer values and the prime number are configured to address each UE of the set of UEs, and transmit, to at least the set of UEs, the control message including the set of multiple integer values and the prime number, the control message transmitted via a group common control channel.

Another apparatus for wireless communication by a base station is described. The apparatus may include means for generating a control message for a set of UEs from a set of multiple UEs, the control message including a set of multiple control information segments, means for selecting a set of multiple integer values and a prime number for inclusion in the control message based on the set of UEs, each integer value of the set of multiple integer values being associated with respective control information segments of the set of multiple control information segments, where the set of multiple integer values and the prime number are configured to address each UE of the set of UEs, and means for transmitting, to at least the set of UEs, the control message including the set of multiple integer values and the prime number, the control message transmitted via a group common control channel.

A non-transitory computer-readable medium storing code for wireless communication by a base station is described. The code may include instructions executable by a processor to generate a control message for a set of UEs from a set of multiple UEs, the control message including a set of multiple control information segments, select a set of multiple integer values and a prime number for inclusion in the control message based on the set of UEs, each integer value of the set of multiple integer values being associated with respective control information segments of the set of multiple control information segments, where the set of multiple integer values and the prime number are configured to address each UE of the set of UEs, and transmit, to at least the set of UEs, the control message including the set of multiple integer values and the prime number, the control message transmitted via a group common control channel.

In some examples of the method, apparatuses, and non-transitory computer-readable medium described herein, selecting the set of multiple integer values may include operations, features, means, or instructions for identifying respective integer values corresponding to IDs of each UE of the set of UEs and determining the set of multiple integer values based on the respective integer values corresponding to the IDs of each UE.

In some examples of the method, apparatuses, and non-transitory computer-readable medium described herein, determining the set of multiple integer values may include operations, features, means, or instructions for determining the set of multiple integer values based on respective remainder values from modulo operations being equal to each integer value of the set of multiple integer values, the modulo operations including the prime number and the respective integer values corresponding to the IDs of each UE.

Some examples of the method, apparatuses, and non-transitory computer-readable medium described herein may further include operations, features, means, or instructions for determining a first integer value corresponding to an ID of a first UE from the set of UEs, where the first integer value may be determined based on a non-integer value of the first UE and a hashing function.

Some examples of the method, apparatuses, and non-transitory computer-readable medium described herein may further include operations, features, means, or instructions for transmitting a configuration of the group common control channel to the first UE, where the configuration indicates the hashing function.

In some examples of the method, apparatuses, and non-transitory computer-readable medium described herein, the non-integer value includes a MAC address, or an IMSI, or any combination thereof.

In some examples of the method, apparatuses, and non-transitory computer-readable medium described herein, respective integer values corresponding to the IDs of each UE includes RNTIs.

Some examples of the method, apparatuses, and non-transitory computer-readable medium described herein may further include operations, features, means, or instructions for selecting one or more flag bits that indicate a format of the control message, where the control message includes the one or more flag bits.

Some examples of the method, apparatuses, and non-transitory computer-readable medium described herein may further include operations, features, means, or instructions for identifying one or more prime numbers of a first set of prime numbers, the first set of prime numbers corresponding to a first bit value of the one or more flag bits, where selecting the prime number may be based on determining whether the one or more prime numbers from the first set of prime numbers satisfy a rule.

Some examples of the method, apparatuses, and non-transitory computer-readable medium described herein may further include operations, features, means, or instructions for determining that the one or more prime numbers of the first set of prime numbers do not satisfy the rule and identifying one or more additional prime numbers of a second set of prime numbers that may be different from the first set of prime numbers, the second set of prime numbers corresponding to a second bit value of the one or more flag bits, where selecting the prime number may be based on determining whether the one or more prime numbers from the second set of prime numbers satisfy the rule.

In some examples of the method, apparatuses, and non-transitory computer-readable medium described herein, the first set of prime numbers corresponds to a first set of UEs of the set of multiple UEs and the second set of prime numbers corresponds to a second set of UEs of the set of multiple UEs, the second set of UEs having a fewer number of UEs than the first set of UEs.

In some examples of the method, apparatuses, and non-transitory computer-readable medium described herein, the one or more flag bits indicate a number of control information segments of the set of multiple control information segments, a number of bits associated with the prime number, a number of bits associated with each integer value of the set of multiple integer values, or any combination thereof. In some examples of the method, apparatuses, and non-transitory computer-readable medium described herein, different values of the one or more flag bits indicate different numbers of total bits associated with the control message.

In some examples of the method, apparatuses, and non-transitory computer-readable medium described herein, the number of bits associated with each integer value may be based on the number of bits associated with the prime number.

In some examples of the method, apparatuses, and non-transitory computer-readable medium described herein, selecting the prime number may include operations, features, means, or instructions for selecting an index of the prime number in a prime number sequence, where the prime number included in the control message includes the index of the prime number.

In some examples of the method, apparatuses, and non-transitory computer-readable medium described herein, the index of the prime number may be from a pre-configured table including a set of multiple prime number indices.

In some examples of the method, apparatuses, and non-transitory computer-readable medium described herein, a number of bits associated with the index of the prime number may be less than a number of bits associated with the prime number.

In some examples of the method, apparatuses, and non-transitory computer-readable medium described herein, the prime number sequence excludes one or more prime numbers that satisfy a prime number threshold.

Some examples of the method, apparatuses, and non-transitory computer-readable medium described herein may further include operations, features, means, or instructions for determining a format for the control message, where the format may be from a set of two or more predefined formats and encoding the control message based on the format.

In some examples of the method, apparatuses, and non-transitory computer-readable medium described herein, the set of two or more predefined formats includes a first format corresponding to the control message having a first bit length, a second format corresponding to the control message having a second bit length greater than the first bit length, a third format corresponding to the control message having a first scrambling sequence, a fourth format corresponding to the control message having a second scrambling sequence different from the first scrambling sequence.

In some examples of the method, apparatuses, and non-transitory computer-readable medium described herein, the prime number may be selected based on a one-to-one function for the set of UEs.

DETAILED DESCRIPTION

Figure 1:
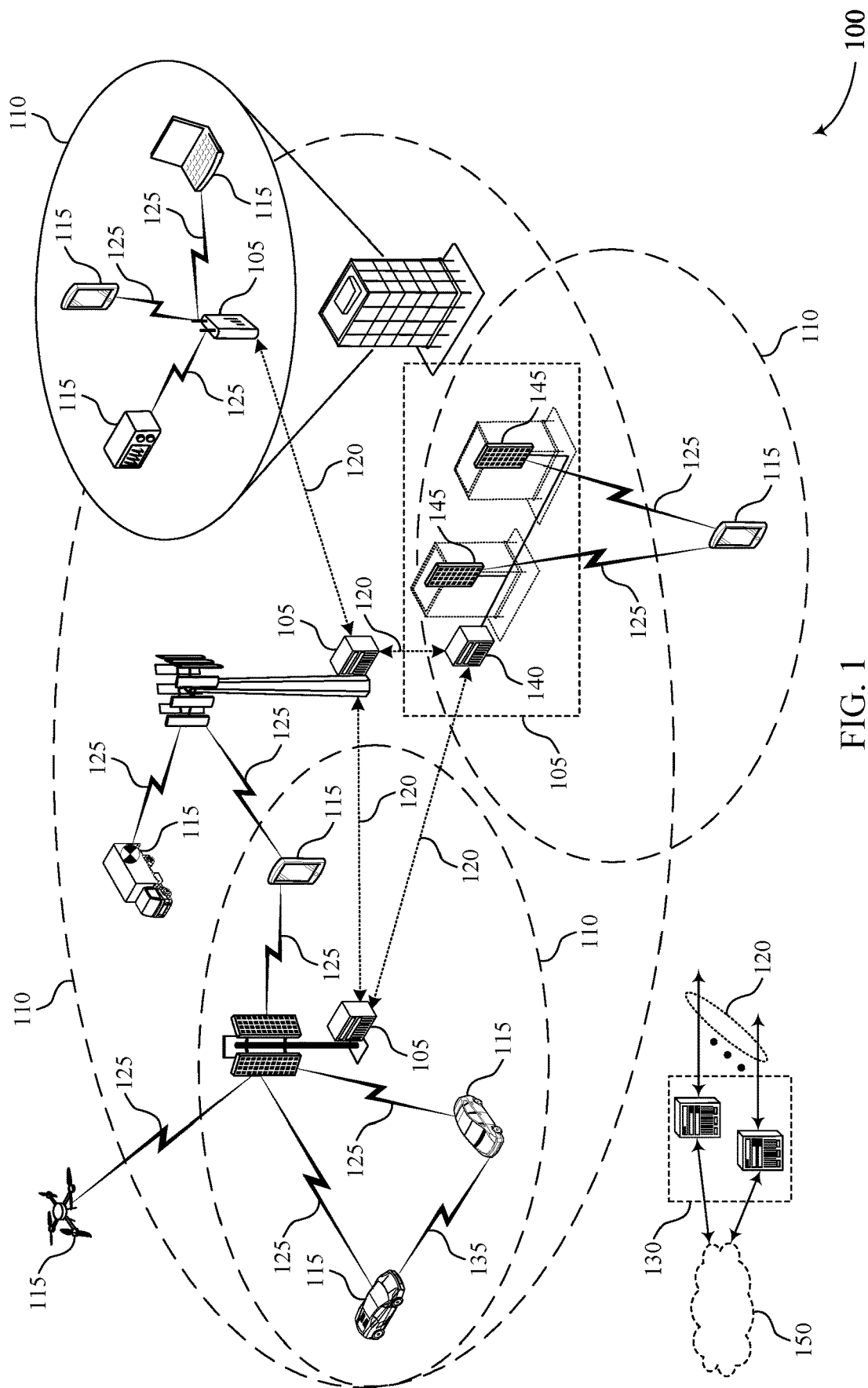
FIG. 1 illustrates an example of a wireless communications system that supports dynamic group common physical control channel assignment techniques in accordance with aspects of the present disclosure.

In some wireless communications systems, a transmitting device in the network (e.g., a base station, a user equipment (UE), or some other node) may transmit a group common control message that may be monitored by a group of UEs (e.g., via a group common physical downlink control channel (GC-PDCCH)). The group common control message may be addressed to a set of UEs (e.g., a set of target UEs) from the group of UEs that monitor for the control message. The control message may include control information and addressing information. For example, a number of bits of the control message may include addressing information for addressing the set of target UEs and a remaining number of bits of the control message may include control information for the target UEs (e.g., a retransmission indication, scheduling information, or the like). In some wireless communications systems, the number of UEs that may be addressed in a given control message may be limited, and the amount of control information that may be included in the control message may be limited by the number of UEs being addressed in the control message. In one example, a control message may be configured to address a set of UEs with a relatively large number of UEs, and the bits used to address the set of UEs may exceed the bits used on the control information, thereby limiting the amount of control information that may be transmitted in a given control message to the set of UEs. Likewise, the number of bits to address the set of UEs may result in increased signaling overhead and other inefficiencies in the system.

As described herein, a UE may determine whether a control message received via a GC-PDCCH is addressed to the UE using relatively fewer bits (e.g., as compared to other techniques that address multiple UEs using identifiers of the UEs). For example, a number of UEs may be efficiently address using a control message that includes relatively fewer bits of information that may be processed by a UE to determine whether it is addressed by the control message. In particular, a control message may include one or more segments of control information, and a respective control information segment may include control information for a particular UE. The control message may include a prime number and an integer value associated with each control information segment of the control message. A UE that receives the GC-PDCCH control including the prime number and the integer values may determine whether the control message applies to the UE by utilizing the prime number, the integer values, and an integer value that represents an identifier (ID) of the UE (e.g., a radio network temporary identifier (RNTI), or some other integer value that may be derived from a non-integer ID of the UE) to determine whether the UE is addressed by the control message.

For example, the described techniques may provide for the UE to compute a remainder value associated with the ID of the UE using a modulo operation including the prime number and the integer representing the ID of the UE. (e.g., the UE may calculate the remainder, r, where r=RNTI mod q). The UE may determine whether a segment of the control message is addressed to the UE based on a comparison of the remainder value with the integer values associated with the different segments. For example, the control message may include i control information segments and respective integer values associated with each segment, $P_i$, and the UE may compare the remainder, r, with each integer value (e.g., $P_1$, $P_2$, ... $P_i$) of the control message. If the UE determines that the remainder value is the same as a first integer value, the UE may determine that the control segment associated with the first integer value is addressed to the UE. In such cases, the UE may identify the particular control information segment that is address to the UE from the control message and decode the control information in the control information segment. If the UE determines that the remainder value is not the same as the first integer value, the UE may compare the remainder value with the other integer values in the control message (e.g., corresponding to other control information segments). If none of the integer values are the same as the remainder value, the UE may determine that the control message is not addressed to the UE, and the UE may refrain from decoding the control information in the control message.

In some examples, the control message may include one or more flag bits. The flag bits may indicate a format of the control channel (e.g., the flag bits may indicate a size of the control message, a bit size of the prime number, a bit size of the integer values, or the like). Additionally or alternatively, the control message may be encoded by selecting a format from a set of configured formats. The UEs may perform blind decoding to determine the format of the control channel. In some examples, by addressing the subgroup of UEs intended to receive the control messages using a prime number (e.g., or a number of bits that represent an index of the prime number in a prime number sequence) and a set of integers, a base station may reduce the number of bits for transmitting address information in a control message, thereby allowing for more UEs to be addressed by the control information in a single control message payload.

Aspects of the disclosure are initially described in the context of wireless communications systems. Aspects of the disclosure are additionally illustrated by and described with reference to control message configurations and process flows. Aspects of the disclosure are further illustrated by and described with reference to apparatus diagrams, system diagrams, and flowcharts that relate to dynamic group common physical control channel assignment techniques.

FIG. 1 illustrates an example of a wireless communications system 100 that supports dynamic group common physical control channel assignment techniques in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. In some examples, the wireless communications system 100 may support techniques for a UE 115 to determine whether a control message received via a GC-PDCCH is addressed to the UE 115.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive a control message from a base station 105 or some other network entity, and the UE 115 may determine applicability of the control message to the UE 115 based on addressing information in the control message. In some cases, a base station 105 may transmit a control message via a group common control channel, such as a GC-PDCCH. The control message may be monitored by a group of UEs 115, and the control message may include one or more control information segments that are addressed to a set of target UEs 115 from the group of UEs 115 that monitor the control message. The control message may include one or more integer values associated with respective control information segments and a prime number. The integer values and the prime number may be configured to address each UE 115 of the set of target UEs 115 using fewer bits than some other addressing techniques. For example, the integer values and the prime number may address the UEs 115 using fewer bits than techniques that utilize a control message including an ID of each target UE 115 (e.g., a "brute force" method).

Each UE 115 that receives the control message may process the prime number, the integer values, and an integer value that corresponds to an ID of the UE 115. The UE 115 may determine applicability of the control message to the UE 115 based on the processing. If the UE 115 determines that the control message includes control information addressed to the UE 115, the UE 115 may decode the respective control information. If the UE 115 determines that the control message does not include control information addressed to the UE 115, the UE 115 may refrain from decoding the control information in the control message. A base station 105 may thereby transmit control information to a set of target UEs 115 using a relatively small number of bits for addressing the target UEs 115 to improve addressing techniques and to allow for more control information to be transmitted in a given control message.

Figure 2:
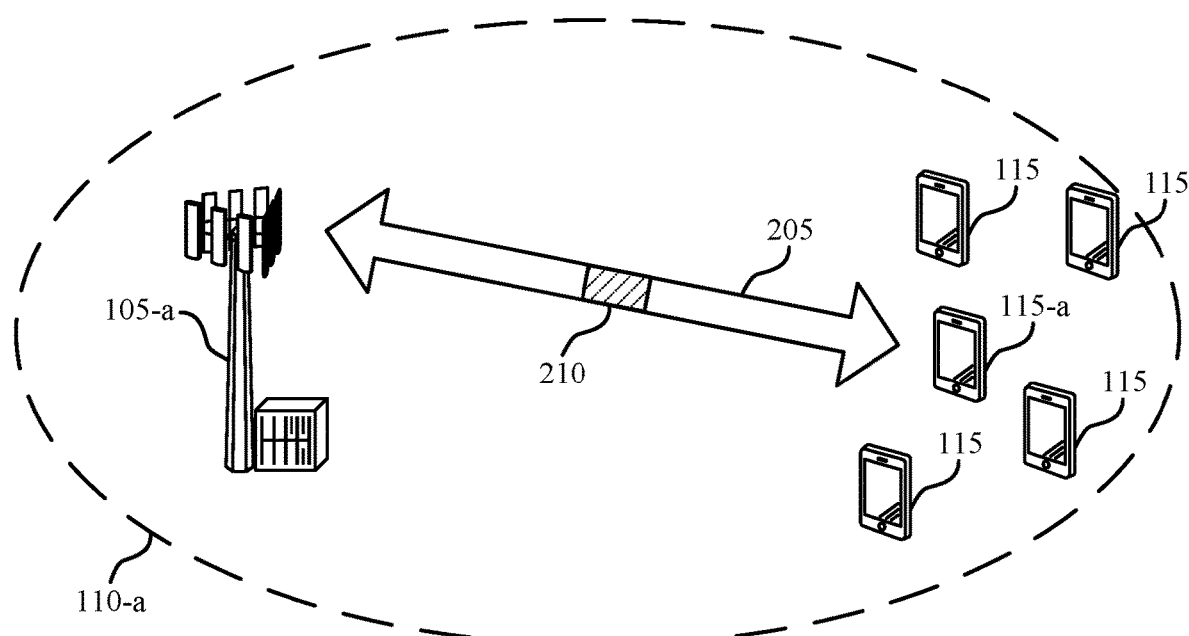
FIG. 2 illustrates an example of a wireless communications system that supports dynamic group common physical control channel assignment techniques in accordance with aspects of the present disclosure.

FIG. 2 illustrates an example of a wireless communications system 200 that supports dynamic group common physical control channel assignment techniques in accordance with aspects of the present disclosure. The wireless communications system 200 may include base station 105-a and multiple UEs 115 (including UE 115-a), which may be examples of a base station 105 and a UE 115 as described with reference to FIG. 1. Base station 105-a and UE 115-a may communicate within geographic coverage area 110-a and over a communication link 205. Base station 105-a may transmit a control message 210 to a group of UEs 115 via the communication link 205. In some examples, UE 115-a may process the control message 210 to determine applicability of the control message 210 to UE 115-a.

A base station 105 may transmit control information (e.g., retransmission indications, scheduling information, or the like) via the control message 210 to the group of UEs 115. The base station 105 may address a set of UEs 115 (e.g., a set of target UEs 115) from the group of UEs 115 that monitor a control channel for the control information. In some cases, the set of UEs 115 addressed by the control information may include a relatively high number of UEs 115 from the group of UEs 115, and a physical downlink control channel (PDCCH) over which the control information is transmitted may become a bottleneck for addressing of the relatively large subgroup of UEs 115.

In the example of a massive capacity industrial sensor network, each sensor UE 115 (e.g., a reduced capability UE 115) in the network may be provided a configured grant (CG) uplink resource to transmit data without asking for a dynamic grant. At each GC occasion, a sensor UE 115 may randomly choose one resource from a GC resource pool. Resource pools of different UEs 115 may overlap to achieve statistical multiplexing. A base station 105, such as base station 105-a, may facilitate over-loading control by turning on and/or off based on a probability of respective UEs 115 using respective GC occasions. In some cases, each sensor UE 115 may be assigned a random hash function (e.g., with a random seed) for accessing a GC resource pool, and a base station 105 may transmit defined random seeds (e.g., optimized random seeds) to respective retransmitting UEs 115 to facilitate almost orthogonal channel access. In some cases, a GC-PDCCH can be used for this purpose and the techniques described herein provide assignment techniques for dynamic group common control channels.

In some cases, a dynamic GC-PDCCH may be used for addressing a dynamic set of adaptive GC uplink UEs 115. For example, a control messaging format for a dynamic GC-PDCCH may be used in combination with assigning a random hashing function of a set of hashing functions to a respective UE 115 for addressing (e.g., each UE 115 may be configured with a random hashing function for processing the control messages 210 received in a GC-PDCCH). A control message 210 may include address data (e.g., an eight bit addressing random seed) and a bitmap (e.g., a verification bit string) to indicate a subset of adaptive GC UEs 115 that may perform retransmissions. The UE 115 may apply the hashing function to the address data and may use the hash output to index to a particular bit in the bitmap. The UE 115 may determine that the control message 210 is addressed to the UE 115 if the particular bit in the bitmap has a first value (e.g., a binary 1). If the particular bit in the bitmap has a second value (e.g., a binary 0), the UE 115 determines that the control message 210 is not addressed to the UE 115. When the UE 115 determines that it is addressed by the GC-PDCCH, the UE 115 may retrieve a control segment from the control message 210, otherwise, the UE 115 may refrain from decoding the control message 210.

In some cases, a brute force method may be used for addressing UEs 115 in a group common control channel. For example, each control information segment of a control message 210 may include an RNTI (e.g., a 16-bit RNTI) for a specific UE 115, which may be at a cost of consuming more bits on the UE 115 IDs than on control information (e.g., random seed). In an example where an initial transmission block error rate (BLER) target is 10%, to send retransmission indications to n (e.g., 5) UEs 115, the GC-PDCCH may dynamically and accurately address those UEs 115 from a group of about 10*n (e.g., 50) GC UEs 115 that are monitoring the GC-PDCCH. In the brute force method, approximately 16*n bits may be used for addressing the n UEs 115 (e.g., 80 bits). In some examples, the number of UEs 115 that may be addressed by a group common control channel may be increased as the number of bits used for addressing the UEs 115 decreases. The described techniques may reduce the number of bits used for addressing UEs 115 via a GC-PDCCH by improving assignment techniques for a dynamic GC-PDCCH.

The techniques for improved GC-PDCCH assignment techniques described herein may be based on elements of a perfect hash function. For example, a perfect hash function may be derived according to a universal space, U, a query set, Q, and a target member set, S. The universal space may include the query set and the target member set (e.g., S⊆Q∈U). The query set may include N values, the target member set may include n values, and N may be greater than or equal to n. In a perfect hash, a function, h, may have a one-to-one mapping for the values in the query set and the target member set. For example, the output range of the function h may be [m]={0, 1, . . . , m−1}, where m≥n. For i≠j, the function may have h(i)≠h(j) with respect to the target member set S (e.g., i∈S (or Q) and j∈S (or Q)).

In the example of dynamic GC-PDCCH addressing techniques, a set of integer values that represent an ID of a UE 115 (e.g., a set of 16-bit integers) may be the universal space, U, a group of UEs 115 that monitor the GC-PDCCH may be the query set, Q, (e.g., the IDs of a dynamic group UEs 115 that may change over time), and a set of UEs 115 of the group of UEs 115 that are addressed by base station 105-*a* (e.g., a set of the IDs of target UEs 115) may be the target member set, S. A GC-PDCCH may carry an encoding (e.g., source-coding) of the perfect hash, where each element in Q (e.g., each UE 115 that monitors the GC-PDCCH) may have a unique position in [m] (e.g., a one-to-one function for addressing the UEs 115). Additionally or alternatively, the output range of the function [e] may be mapped to S (e.g., the set of target UEs 115 may determine how they are addressed by a control message in the GC-PDCCH).

In some examples, addressing UEs 115 based on a perfect hash function and source coding may include a significant number of bits. For example, if the output range of the hash function, m, is the same as the number of UEs 115 that monitor the GC-PDCCH, |Q| (e.g., a minimum perfect hash), the number of bits for addressing the UEs 115 may be bounded by 1.44|Q| bits or more. If the output range of the hash function is greater than the number of UEs 115 that monitor the GC-PDCCH (e.g., m>|Q|), fewer bits may be needed for encoding than if the output range of the hash function is less than or equal to the number of UEs 115 that monitor the GC-PDCCH (e.g., m≤|Q|), but converting the output range of the hashing function, [m], to the target set of UEs 115, S, may use more bits than the minimum perfect hash case. In some cases (e.g., practical encoding schemes), 2|Q| bits may be used. For example, if the number of UEs 115 that monitor the GC-PDCCH is 50, around 100 bits may be used for encoding the perfect hash to address the target UEs 115 (e.g., 5 target UEs 115).

As described herein, however, the number of bits for addressing a set of target UEs 115 may be reduced by using a techniques based on the perfect hash function, but without a relatively high number of bits for addressing UEs 115. For example, a mapping that is one-to-one (e.g., a perfect hash) for the set of UEs 115 that are addressed by the control message 210 (e.g., the target member set, S) may be sufficient even if the function is not one-to-one for each UE 115 that monitors the GC-PDCCH (e.g., there may be collisions within the query set, Q). A compression may be performed on the set of target UEs 115 such that the number of bits used for expressing an ID of each target UE 115 of the set may be reduced. For example, if the number of values (e.g., UE IDs) of the target member set is S, there may exist a prime number, q (e.g., q<$Q^2$ log(u), where u is the number of integer values in the universal set) such that the function x→x mod q is perfect (e.g., without collision) for the subgroup of UEs 115. Thus, base station 105-*a* may perform such a compression (e.g., a lossless compression) on the set of target UEs 115 to determine a prime number, q, that may be used for addressing the UEs 115 via the control message 210. In some examples, the compression may be lossless for the set of target UEs 115 addressed by the control message 210, and the compression may be lossy for the group of UEs 115 that monitor the GC-PDCCH but are not addressed by the control message 210 (e.g., Q\S).

Thus, the described techniques may provide for improved assignments of UEs 115 based on the lossless compression of the set of target UEs 115 to be addressed by a control message 210. For example, with reference to FIG. 2, base station 105-*a* may generate the control message 210 for a set of UEs 115 to be scheduled for retransmissions or transmissions. The control message 210 may be transmitted via a GC-PDCCH that may be monitored by a group of UEs 115 including the set of UEs 115 addressed by the control message 210. The control message 210 may include one or more segments of control information, and a respective segment may include control information for a particular UE 115 of the set, such as UE 115-*a*. The control message 210 may include a prime number (e.g., q) and an integer value associated with each segment of the control message (e.g., $P_1$ through $P_i$ for each segment with indices 1 through i).

The integer values may be associated with an ID of the particular UE 115 addressed by the corresponding control information segment. For example, if base station 105-*a* transmits control information to UE 115-*a* via a first control information segment, base station 105-*a* may select a first integer value corresponding to the first control information segment based on the ID of UE 115-*a*. In some examples, the ID of UE 115-*a* may be an integer value (e.g., an RNTI). Additionally or alternatively, the ID of UE 115-*a* may be a non-integer ID (e.g., an Institute of Electrical and Electronics Engineers (IEEE) MAC address, an international mobile subscriber identity (IMSI), or the like). In such cases, UE 115-*a* may receive a configuration of the GC-PDCCH that may indicate a hashing function for converting the non-integer ID to an integer value that represents the ID of UE 115-*a* (e.g., such that the integer value that represents the ID of UE 115-*a* may be within the universal set of integer IDs).

UE 115-*a* may determine whether the control information segment is or is not addressed to UE 115-*a* based on the prime number, the integer values, and the integer that represents an ID of UE 115-*a*. For example, UE 115-*a* may be configured to compute a remainder value associated with the ID of UE 115-*a* using a modulo operation including the prime number, q, conveyed via the control message 210 and the integer value representing the ID of UE 115-*a* (e.g., UE 115-*a* may calculate the remainder, r, where r=RNTI mod q). UE 115-*a* may determine whether a segment of the control message 210 is addressed to UE 115-*a* based on a comparison of the remainder value with the integer values associated with the control information segments. If the remainder value is the same as one of the integer values associated with respective control information segments, UE 115-*a* may determine that it is addressed by the control message 210. As an example, if the remainder value is the same as a first integer value, UE 115-*a* determines that the control information segment associated with the first integer value is addressed to UE 115-*a*, and UE 115-*a* may decode the control information. In some examples, the control information segment may include a retransmission indication, and UE 115-*a* may retransmit data based on receiving and decoding the control information. If the remainder value is not the same as the first integer value, UE 115-*a* may compare the remainder value with the other integer values in the control message 210 to determine if a control information segment is addressed to UE 115-*a*. If none of the integers match the remainder value, UE 115-*a* may refrain from decoding the control message 210. By determining whether the control information is addressed to UE 115-*a* using the described techniques, UE 115-*a* may refrain from decoding irrelevant control information and reduce latency associated with communications.

In some examples, the control message 210 may include one or more flag bits that may indicate a format of the control channel (e.g., the flag bits may indicate the size of the control message 210, the bit size of the prime number, the integer values, or some combination thereof). Additionally or alternatively, the control message 210 may be encoded by selecting a format from a set of configured formats, and the UEs 115 may perform blind decoding to determine the format used for encoding the control channel.

Base station 105-*a* may thereby address a set of UEs 115 by determining a prime number, q, and a set of integers, {$P_1, \ldots, P_i$}, based on a perfect hash function for the set of UEs 115 to reduce the number of bits for addressing a set of target UEs 115. By addressing the target UEs 115 using the described techniques, base station 105-*a* may allow for more UEs 115 to be accurately and efficiently addressed in a given control message payload.

Figure 3A:
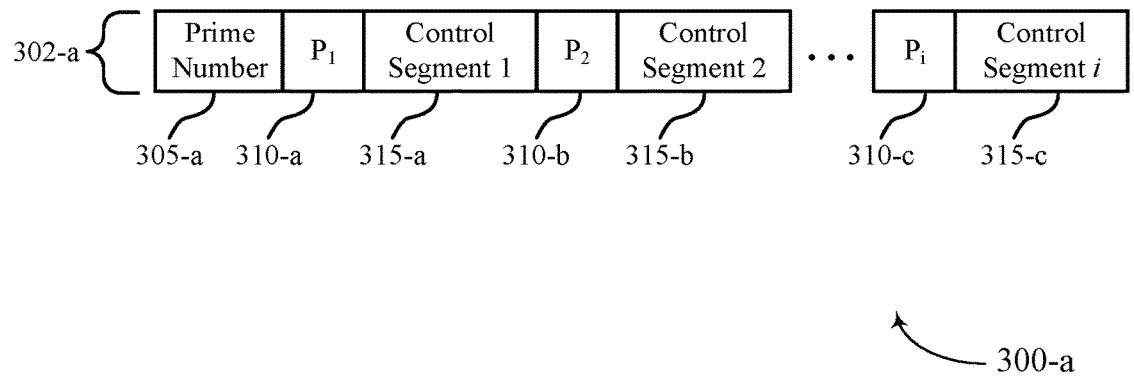
FIGS. 3A and 3B illustrates an example of a control message configuration that supports dynamic group common physical control channel assignment techniques in accordance with aspects of the present disclosure.
Figure 3B:
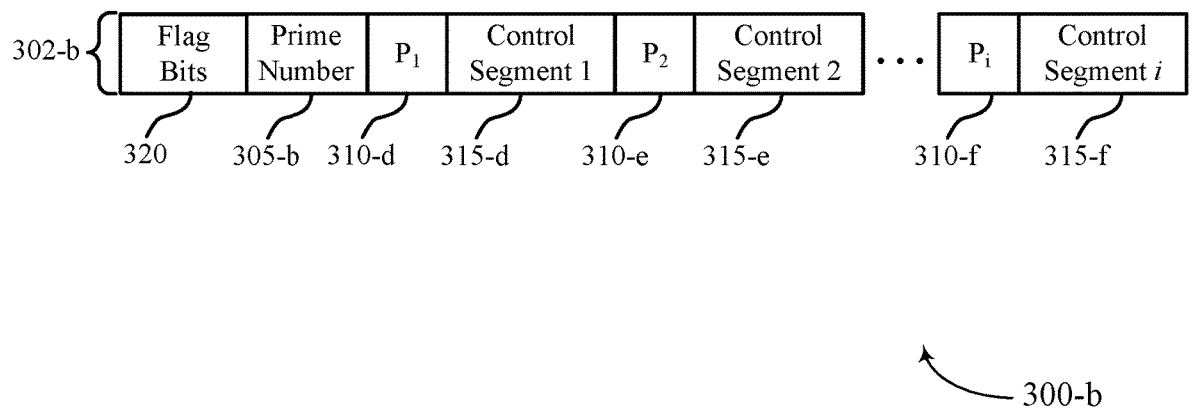

FIGS. 3A and 3B illustrate examples of control message configurations 300-*a* and 300-*b*, respectively, that support dynamic group common physical control channel assignment techniques in accordance with aspects of the present disclosure. The control message configurations 300-*a* and 300-*b* may be examples of configurations of a control message 210 as described with reference to FIG. 2. Control message configurations 300-*a* and 300-*b* may provide for improved techniques for indicating applicability of the control information segments 315 to respective UEs.

FIG. 3A illustrates a control message configuration 300-*a*. Control message configuration 300-*a* may illustrate a configuration of a payload of a control message 302-*a*. The payload may include control information segments 315-*a*, 315-*b*, and 315-*c* (e.g., Control Segment 1, Control Segment 2, through Control Segment i), and each control information segment 315 may include control information for a particular UE. The payload may include a prime number 305-*a* and a set of integer values 310-*a*, 310-*b*, and 310-*c* (e.g., integer values $P_1, P_2$, through $P_i$). In some cases, the prime number 305-*a* and a set of integer values 310-*a*, 310-*b*, and 310-*c* may be located within respective fields of the control message 302-*a*. Each integer value 310 may be associated with a control information segment 315. For example, integer value 310-*a* (e.g., $P_1$) may be associated with control information segment 315-*a* (e.g., Control Segment 1), integer value 310-*b* (e.g., $P_2$) may be associated with control information segment 315-*b* (e.g., Control Segment 2), and so forth. The number, i, of control information segments 315 may be the same as the number of integer values 310, and each control information segment 315 and respective integer value 310 may be associated with an index from one to i (e.g., 1, 2, . . . i).

A group of UEs (e.g., a set of adaptive GC UEs) may monitor a GC-PDCCH for a control message 302-*a*, as described with reference to FIG. 2. A UE that receives a control message 302-*a* having the control message configuration 300-*a* illustrated in FIG. 3A may determine whether at least one control information segment 315 of the control message 302-*a* applies to the UE based on the prime number 305-*a*, the integer values 310, and an integer that represents an ID of the UE. In some examples, each control information segment 315 may include a number of bits of control information (e.g., eight bits of control information). The control information may include a retransmission indication for a UE. Additionally or alternatively, the payload illustrated by control message configuration 300-*a* may be used for sidelink communications, wakeup signaling, or some other communication that may benefit from addressing a set of UEs from a dynamic group of UEs.

As described with reference to FIG. 2, each UE 115 may be associated with an integer that represents an ID of the UE 115. For example, the integers representing IDs of the UEs 115 may be RNTIs. Additionally or alternatively, the integers representing IDs of the UEs 115 may be calculated from non-integer IDs (e.g., IMSIs or IEEE MAC addresses) based on a configured hash function.

The integer values 310-*a* through 310-*c* of the control message 302-*a* illustrated in FIG. 3A may be obtained using prime number 305-*a* and the one or more integers corresponding to IDs of the UEs that are addressed by the control information. Each integer value 310 may be determined based on a respective remainder value. For example, a base station or some other network entity may determine a remainder value from a modulo operation including prime number 305-*a* and an ID of a target UE of the set of UEs (e.g., r=RNTI mod q, where q represents prime number 305-*a*). In the example of control message configuration 300-*a*, integer value 310-*c* may be determined based on a remainder value of a modulo operation of an ID of a UE that is meant to receive the control information of control information segment 315-*c* over prime number 305-*a*. Integer value 310-*c* may thereby address the intended target UE using fewer bits than if the base station transmitted the ID of the target UE (e.g., a 16-bit ID) via the control message 302-*a*.

A UE may receive the control message 302-*a* and determine applicability of each control information segment 315 to the UE based on each respective integer value 310 and a remainder value of an ID of the UE over prime number 305-*a*. For example, a UE may determine applicability of a control information segment 315 to the UE (e.g., whether the control information segment 315 is addressed to the UE) by calculating a remainder value based on an ID of the UE in a similar calculation used by the base station for determining the integer value 310 for the respective control information segment 315 (e.g., the UE may calculate a remainder value, r, using, for example, a modulo operation where r=RNTI mod q). The UE may compare the remainder value with the integer value 310 to determine applicability of the respective control information segment 315.

In one example, a UE may compare a calculated remainder value with integer value 310-*a*. If the UE determines that the remainder value is the same as integer value 310-*a*, the UE may determine applicability of control information segment 315-*a* and may retrieve and decode the control information of control information segment 315-*a*. If the UE determines that the remainder value is different from integer value 310-*a*, the UE may refrain from retrieving the control information of control information segment 315-*a*, and the UE may compare the remainder value with integer value 310-*b*. The UE may continue to compare the remainder value with each integer value 310 (e.g., $P_1$ through $P_i$) until the UE determines that the remainder value is the same as an integer value 310, or until the UE determines that the remainder value is not the same as any of the integer values 310 of the control message 302-*a*. The UE may thereby retrieve and decode control information that is addressed to the UE, and the UE may refrain from retrieving control information that is not addressed to the UE, which may reduce overhead and latency associated with communications.

The control message payload may be associated with a total number of bits (e.g., a 120-bit payload). The total number of bits may include a number of bits for each control information segment 315 (e.g., eight bits), a number of bits for each integer value 310 (e.g., 16 bits), a number of bits for prime number 305-*a*, or some combination thereof. In some examples, a control message payload may include 120 bits or less. The number of target UEs from a group of monitoring UEs (e.g., a group of 50 UEs that monitor for the control message 302-*a*) may be higher if the control message 302-*a* is configured according to control message configuration 300-*a* and includes prime number 305-*a* and the integer values 310 as described herein than if the control message 302-*a* addresses each UE individually (e.g., a brute force addressing method), or if the network uses some other method for addressing.

In some examples, a base station may transmit an index of prime number 305-*a* in a sequence of prime numbers 305 (e.g., a sequence of all prime numbers starting from two) to reduce the number of bits associated with the control message 302-*a*. For example, the prime number may be associated with a number of bits, and the number of bits associated with the index of the prime number may be less than the number of bits associated with the prime number. The bit-width of the index of the prime number may be compressed by excluding one or more prime numbers from the prime number sequence (e.g., relatively small prime numbers such as 2, 3, 5, 7, etc.).

A control message 302-*a* configured according to control message configuration 300-*a* may thereby transmit control information and addressing information to a set of target UEs using a reduced number of bits than current addressing techniques. By determining prime number 305-*a* and integer values 310-*a*, 310-*b*, and 310-*c*, a base station may perform a lossless compression on a set of target UEs, which may allow the base station to address more UEs using fewer bits in a given control message.

FIG. 3B illustrates another control message configuration 300-*b*. Control message configuration 300-*b* illustrates a configuration of a payload of a control message 302-*b*. The payload may include prime number 305-*b*, a set of integer values 310-*d*, 310-*e*, and 310-*f* (e.g., integer values $P_1$, $P_2$, through $P_i$), and a set of control information segments 315-*d*, 315-*e*, and 315-*f* (e.g., Control Segment 1, Control Segment 2, through Control Segment i), which may be examples of prime number 305-*a*, the integer values 310, and the control information segments 315, respectively, described with reference to FIG. 3A. The control message illustrated in FIG. 3B may be used for transmitting control information and addressing a set of target UEs using fewer bits than other methods, as described with reference to FIG. 3A.

Control message configuration 300-*b* may include (e.g., within a field of the control message 302-*b*) one or more flag bits 320 (e.g., two bits, three bits, or some other number of bits transmitted via a flag field in the control message 302-*b*) to indicate a format of the payload of the control message 302-*b*. For example, different values of the flag bits 320 may indicate different numbers of total bits associated with the control message 302-*b*. The one or more flag bits 320 may indicate a number of control information segments 315 of the set of control information segments 315, a number of bits associated with prime number 305-*b*, a number of bits associated with each integer value 310 of the set of integer values 310, or any combination thereof. Example values of the flag bits 320 and corresponding bit configurations for a payload of the control message 302-*b* may be shown in Table 1.

TABLE 1

Flag Bit Indications for Control Message Payload Formats

| Flag Bits | Number of Control Information Segments | Number of Bits of Prime Number | Number of Bits of the Integer Values | Total Number of Bits |
|---|---|---|---|---|
| 11 | 8 | 5 | 6 | 119 |
| 10 | 7 | 6 | 8 | 120 |
| 01 | 6 | 8 | 10 | 118 |
| 00 | 5 | 0 | 16 | 120 |

For example, Table 1 illustrates four possible arrangements of the control message 302-*b* based on four values of the flag bits 320. It is to be understood that while the flag bits 320 are shown to be two bits and indicate four control message payload formats, the flag bits 320 may be any number of bits and may indicate any number of control message payload formats, including control message payload formats that are not shown in Table 1.

In the example of Table 1, the control message 302-*b* may be transmitted via a GC-PDCCH that may be configured with a constant payload size (e.g., 120-bit payloads). Thus, the flag bits 320 may indicate a format of a control message payload that includes less than or equal to the number of bits associated with the constant payload size.

A default format of the control message payload may be indicated by a binary "00" as shown in Table 1. If the flag bits 320 are set to "00," the control message 302-b may include a default number of control information segments 315 (e.g., five). The default control message format may not include a prime number 305 (e.g., zero bits may be reserved for the prime number 305), and each control information segment 315 may be addressed to a respective UE using an integer value 310 that represents an ID of the UE (e.g., similar to a brute force method). The number of bits of the integer values 310 for the default format may thereby be 16 (e.g., for each 16-bit UE ID). The total number of bits for the default control message 302-b may be 120 bits. For example, in the example of Table 1, the default control message 302-b may include five control segments that include eight bits per segment and 16 addressing bits associated with each of the five segments (e.g., 5(8 bits)+5(16 bits)=120 total bits). If the two flag bits 320 are included, the total number of bits may be 122, which may be greater than the constant payload size (e.g., 120 bits).

When the value of the flag bits 320 is a binary "01," the flag bits 320 may indicate that six control information segments 315 may be conveyed via the control message payload. If a prime number of 1021 is chosen as a maximum number for prime number 305-b (e.g., the 173$^{rd}$ prime number in a sequence of prime numbers), eight bits or less may be used to represent prime number 305-b. Each integer value 310 (e.g., a remainder value based on prime number 305-b) may be represented by ten bits. The total number of bits for transmitting the control message payload addressing six UEs may be 118 (e.g., 8 bit prime number+6 control segments*(8 bits)+6 integers*(10 bits)+2 flag bits=118 total bits). The flag bit value "01" may indicate such bit lengths to a receiving UE.

A binary value of "10" may indicate that seven control information segments 315 may be conveyed via the control message payload, and six bits may be used to represent prime number 305-b. The remainder value of a modulo operation including an integer value representing an ID of a UE (e.g., 16 bits) over prime number 305-b (e.g., a six bit prime number) may be represented by eight bits. Thus, the seven integer values 310 corresponding to each of the seven control information segments 315 may be represented by eight bits each. The control message 302-b may thereby address seven UEs using 120 bits with the format indicated by the binary value "10" (e.g., 6 bit prime number+7 control segments*(8 bits)+7 integers*(8 bits)+2 flag bits=120 total bits).

A binary value of the flag bits 320 set to "11" may indicate that eight control information segments 315 are conveyed via the control message payload, and five bits may be used to represent prime number 305-b. The remainder value of a modulo operation of an integer value representing an ID of a UE (e.g., 16 bits) over prime number 305-b (e.g., a five bit prime number) may be represented by six bits. Thus, the flag bits 320 may indicate that the eight integer values 310 corresponding to each of the eight control information segments 315 may be represented by six bits each. The control message 302-b may thereby address eight UEs using 119 bits with the format indicated by the binary value "11" (e.g., 5 bit prime number+8 control segments*(8 bits)+8 integers*(6 bits)+2 flag bits=119 total bits).

Thus, the four example flag bit values and corresponding control channel formats in Table 1 illustrate example formats for addressing a number of UEs using 120 bits or fewer. The flag bits 320 may indicate, to the UEs receiving the control message 302-b, which format of the configured table of formats is used. By selecting a prime number 305 and corresponding integer values 310 to address the most UEs with the fewest bits, a base station may address more UEs in a control message payload having a constant size than if the base station addresses the UEs using another method. It is understood that the flag bits 320 may be any number of bits, and may correspond to different control channel formats than the flag bit values and corresponding control channel formats shown in Table 1.

In some examples, a base station may refrain from transmitting the flag bits 320 via the control message 302-b, and the base station may encode the control message 302-b according to one of a set of control message formats (e.g., predefined formats, such as Layer 3 (L3) configurations). The set of formats for encoding the control message may include a formats for encoding the control message according to different bit lengths (e.g., 120-bits, 160-bits, or some other bit length), different scrambling sequences, or both. For example, a first format may correspond to the control message 302-b having a first bit length, a second format may correspond to the control message 302-b having a second bit length that may be greater than the first bit length, a third format may correspond to the control message 302-b having a first scrambling sequence, a fourth format may correspond to the control message 302-b having a second scrambling sequence that may be different from the first scrambling sequence, and so on. A UE may perform blind decoding of the control message 302-b to determine which format was used for encoding the control message 302-b. The UE may decode the control message 302-b according to the determined format.

Figure 4:
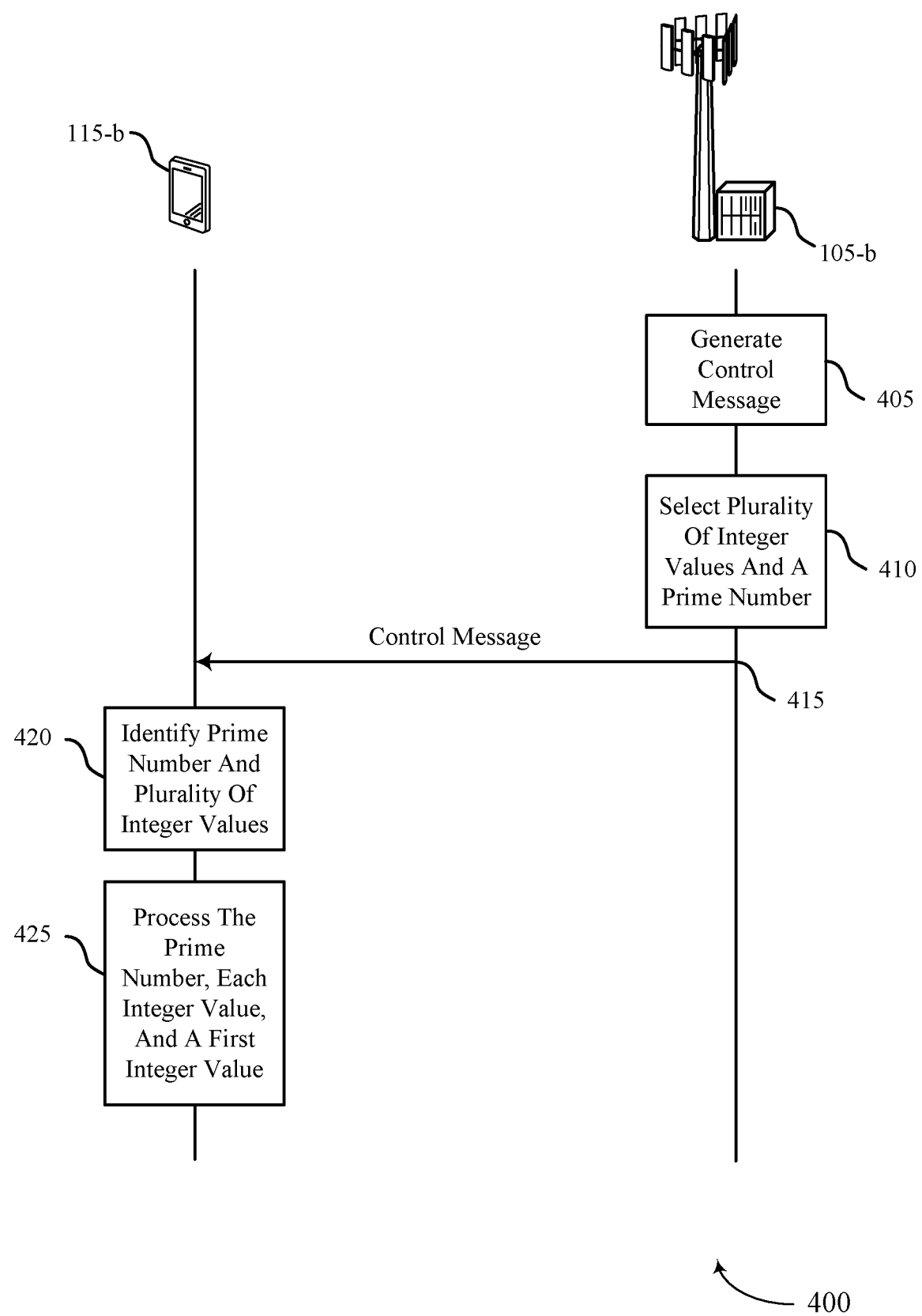
FIG. 4 illustrates an example of a process flow in a system that supports dynamic group common physical control channel assignment techniques in accordance with aspects of the present disclosure.

FIG. 4 illustrates an example of a process flow 400 in a system that supports dynamic group common physical control channel assignment techniques in accordance with aspects of the present disclosure. In some examples, the process flow 400 may implement various aspects of the present disclosure described with reference to FIGS. 1-3. The process flow 400 may include UE 115-b and base station 105-b, which may be examples of a UE 115 and a base station 105 as described with reference to FIGS. 1 and 2. In some examples, base station 105-b may transmit a control message to UE 115-b via a GC-PDCCH, and UE 115-b may determine applicability of the control message to UE 115-b based on one or more parameters conveyed via the control message and an ID of UE 115-b. Alternative examples of the following may be implemented, where some steps are performed in a different order then described or are not performed at all. In some cases, a step may include additional features not mentioned below, or further steps may be added.

In the following description of the process flow 400, the operations between UE 115-b and base station 105-b may be performed in different orders or at different times. Some operations may also be left out of the process flow 400, or other operations may be added. It is to be understood that while the operations of the process flow 400 are shown between a base station 105 and a UE 115, any wireless device may perform the operations shown in any order to efficiently address a set of UEs 115 of a dynamic group of UEs 115.

At 405, base station 105-b may generate a control message for a set of UEs 115 (e.g., target UEs 115) from a group of UEs 115. The control message may include a plurality of control information segments. Each control information segment may include control information for a particular UE 115 of the set of UEs 115. For example, the control message may include a control information segment that may include control information for UE 115-*b*.

At 410, base station 105-*b* may select a plurality of integer values and a prime number for inclusion in the control message. Each integer value may be associated with a respective control information segment. The integer values and the prime number may be selected based on the set of target UEs 115 and may be configured to address each UE 115 of the set of UEs 115. For example, base station 105-*b* may identify respective integer values corresponding to IDs of each target UE 115. Base station 105-*b* may determine the plurality of integer values to include in the control message based on the integer values corresponding to IDs of the UEs 115.

In some examples, at 410, base station 105-*b* may determine the plurality of integer values based on respective remainder values from one or more modulo operations. For example, base station 105-*b* may perform a modulo operation of an integer value corresponding to an ID of a particular UE 115 over the prime number, and base station 105-*b* may select an integer value based on the remainder of the modulo operation, as described with reference to FIGS. 2 and 3.

At 415, base station 105-*b* may transmit the control message including the plurality of integer values and the prime number to UE 115-*b* and one or more other UEs 115. The one or more other UEs 115 may include at least the set of target UEs 115 that may be addressed by the control message. Base station 105-*b* may transmit the control message via a group common control channel, such as a GC-PDCCH.

At 420, UE 115-*b* may identify the prime number and the plurality of integer values included in the control message. UE 115-*b* may identify each integer value associated with each of the control information segments.

At 425, UE 115-*b* may process the prime number, each integer value, and a first integer value corresponding to an ID of UE 115-*b* to determine applicability of the control message to UE 115-*b*. For example, UE 115-*b* may calculate a remainder value using a modulo operation that may include the prime number and the first integer value corresponding to the ID of UE 115-*b*. UE 115-*b* may compare the remainder value with each integer value to determine applicability of the control message to UE 115-*b*. UE 115-*b* may compare the remainder value with each integer value of the control message until UE 115-*b* determines that the remainder value is the same as an integer value, or until UE 115-*b* determines that the remainder value is different from each integer value conveyed via the control message.

UE 115-*b* may retrieve the control information from a particular control information segment if UE 115-*b* determines that the remainder value is the same as an integer value associated with the respective control information segment (e.g., the control information is applicable to UE 115-*b*). Additionally or alternatively, UE 115-*b* may refrain from decoding the control information of a control information segment if UE 115-*b* determines that the remainder value is different from an integer value associated with the control information segment.

Figure 5:
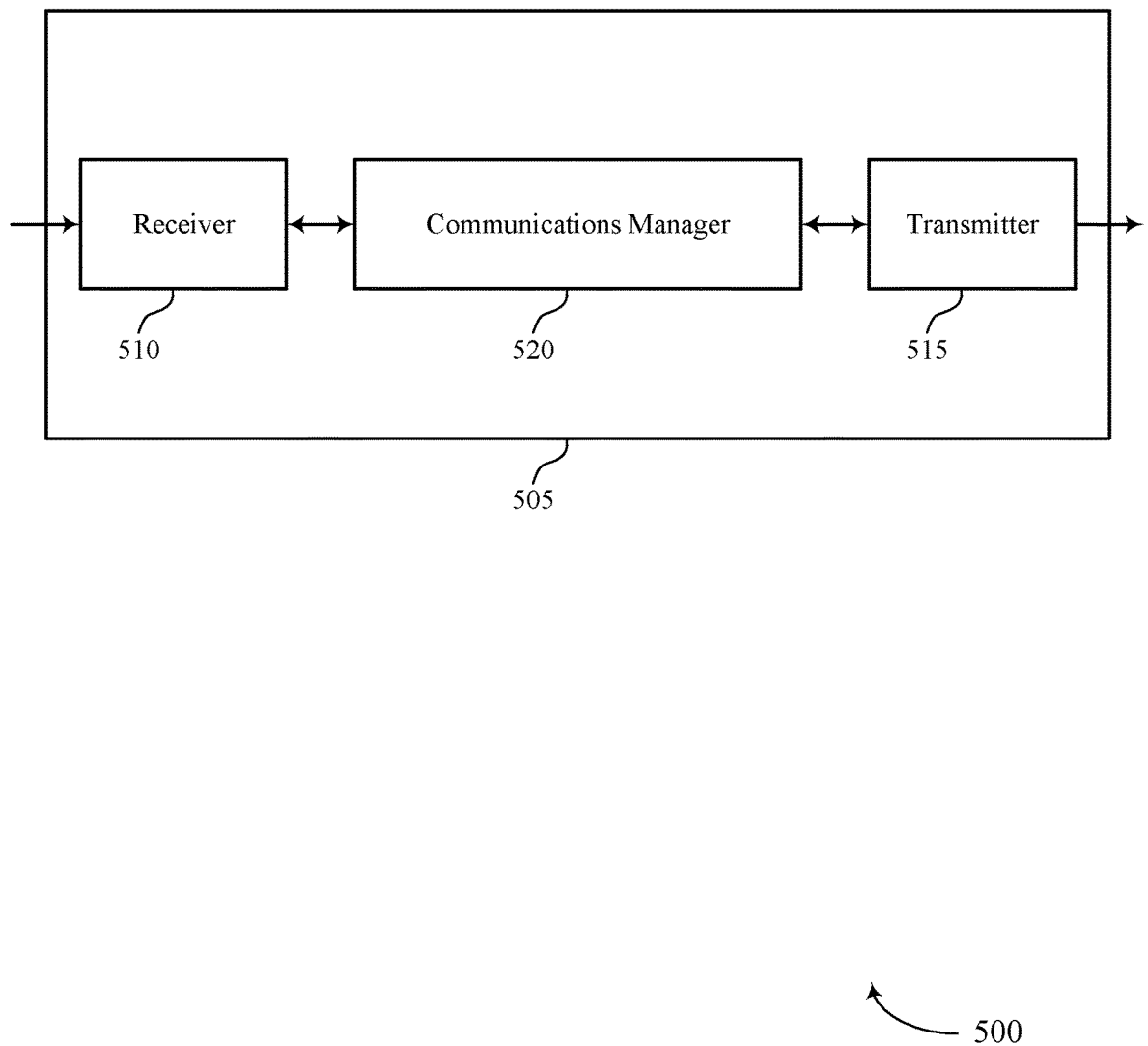
FIGS. 5 and 6 show block diagrams of devices that support dynamic group common physical control channel assignment techniques in accordance with aspects of the present disclosure.

FIG. 5 shows a block diagram 500 of a device 505 that supports dynamic group common physical control channel assignment techniques in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to dynamic group common physical control channel assignment techniques). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to dynamic group common physical control channel assignment techniques). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of dynamic group common physical control channel assignment techniques as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication by a UE in accordance with examples as disclosed herein. For example, the communications manager 520 may be configured as or otherwise support a means for receiving a control message via a group common control channel, the control message including a set of multiple control information segments for a set of UEs from a set of multiple UEs. The communications manager 520 may be configured as or otherwise support a means for identifying, within the control message, a prime number and a set of multiple integer values, each integer value of the set of multiple integer values being associated with respective control information segments of the set of multiple control information segments. The communications manager 520 may be configured as or otherwise support a means for processing the prime number, each integer value of the set of multiple integer values, and a first integer value corresponding to an ID of the UE to determine applicability of the control message to the UE.

By including or configuring the communications manager 520 in accordance with examples as described herein, the device 505 (e.g., a processor controlling or otherwise coupled to the receiver 510, the transmitter 515, the communications manager 520, or a combination thereof) may support improved addressing techniques for control messages, which may allow for reduced processing and more efficient utilization of communication resources. For example, by calculating a remainder value based on a modulo operation of the ID of the device 505 over a prime number conveyed via a control message and comparing the remainder value with each integer value of the control message, the processor may refrain from decoding a control information segment that is not addressed to the device 505. If the processor determines that the remainder value is the same as one or more of the integer values, the processor may decode the applicable control information segment. Thus, the described techniques may provide for the processor to decode control information addressed to the device 505 and refrain from decoding control information that is not addressed to the device 505, thereby reducing processing and power consumption.

Figure 6:
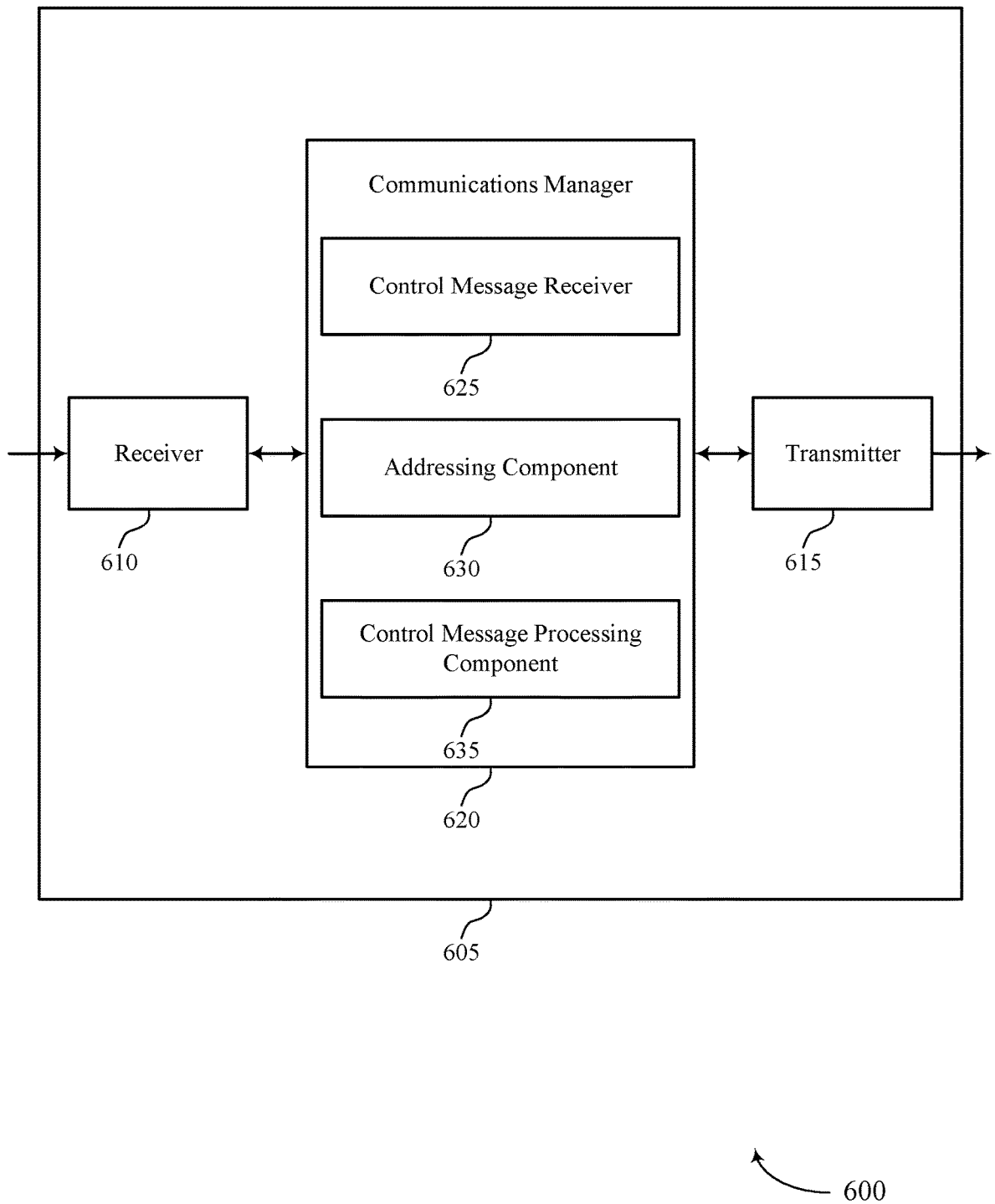

FIG. 6 shows a block diagram 600 of a device 605 that supports dynamic group common physical control channel assignment techniques in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic group common physical control channel assignment techniques). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic group common physical control channel assignment techniques). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of dynamic group common physical control channel assignment techniques as described herein. For example, the communications manager 620 may include a control message receiver 625, an addressing component 630, a control message processing component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication by a UE in accordance with examples as disclosed herein. The control message receiver 625 may be configured as or otherwise support a means for receiving a control message via a group common control channel, the control message including a set of multiple control information segments for a set of UEs from a set of multiple UEs. The addressing component 630 may be configured as or otherwise support a means for identifying, within the control message, a prime number and a set of multiple integer values, each integer value of the set of multiple integer values being associated with respective control information segments of the set of multiple control information segments. The control message processing component 635 may be configured as or otherwise support a means for processing the prime number, each integer value of the set of multiple integer values, and a first integer value corresponding to an ID of the UE to determine applicability of the control message to the UE.

Figure 7:
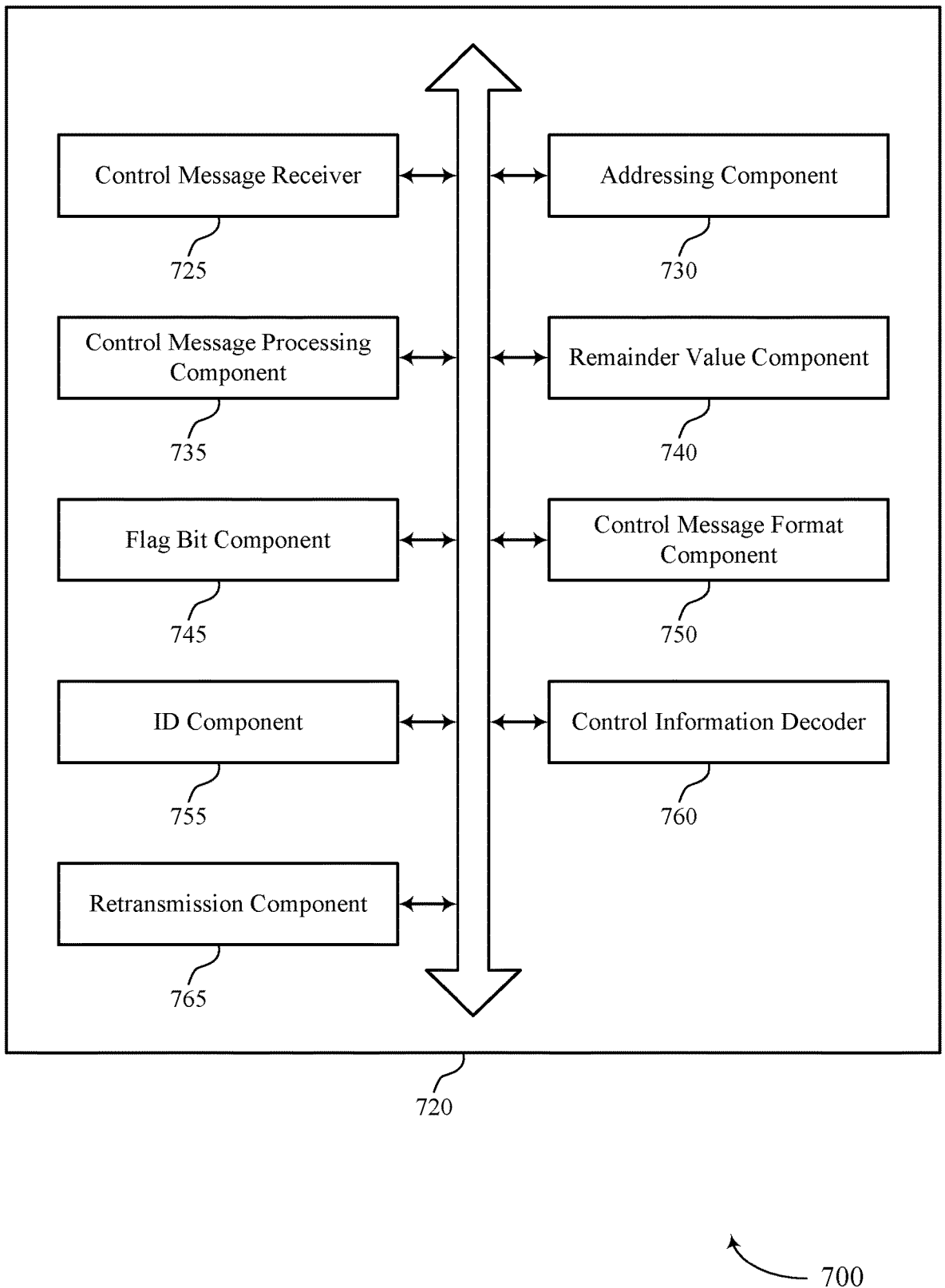
FIG. 7 shows a block diagram of a communications manager that supports dynamic group common physical control channel assignment techniques in accordance with aspects of the present disclosure.

FIG. 7 shows a block diagram 700 of a communications manager 720 that supports dynamic group common physical control channel assignment techniques in accordance with aspects of the present disclosure. The communications manager 720 may be an example of aspects of a communications manager 520, a communications manager 620, or both, as described herein. The communications manager 720, or various components thereof, may be an example of means for performing various aspects of dynamic group common physical control channel assignment techniques as described herein. For example, the communications manager 720 may include a control message receiver 725, an addressing component 730, a control message processing component 735, a remainder value component 740, a flag bit component 745, a control message format component 750, an ID component 755, a control information decoder 760, a retransmission component 765, or any combination thereof. Each of these components may communicate, directly or indirectly, with one another (e.g., via one or more buses).

The communications manager 720 may support wireless communication by a UE in accordance with examples as disclosed herein. The control message receiver 725 may be configured as or otherwise support a means for receiving a control message via a group common control channel, the control message including a set of multiple control information segments for a set of UEs from a set of multiple UEs. The addressing component 730 may be configured as or otherwise support a means for identifying, within the control message, a prime number and a set of multiple integer values, each integer value of the set of multiple integer values being associated with respective control information segments of the set of multiple control information segments. The control message processing component 735 may be configured as or otherwise support a means for processing the prime number, each integer value of the set of multiple integer values, and a first integer value corresponding to an ID of the UE to determine applicability of the control message to the UE.

In some examples, to support processing the prime number, each integer value, and the first integer value, the remainder value component 740 may be configured as or otherwise support a means for calculating a remainder value using a modulo operation that includes the prime number and the first integer value corresponding to the ID of the UE. In some examples, to support processing the prime number, each integer value, and the first integer value, the addressing component 730 may be configured as or otherwise support a means for comparing the remainder value with each integer value of the set of multiple integer values, where the comparison indicates the applicability of the control message to the UE.

In some examples, the remainder value component 740 may be configured as or otherwise support a means for determining that a first control information segment of the set of multiple control information segments is addressed to the UE based on the remainder value being the same as an integer value of the set of multiple integer values, where the integer value is associated with the first control information segment. In some examples, the control information decoder 760 may be configured as or otherwise support a means for decoding control information from the first control information segment based on determining that the first control information segment is addressed to the UE.

In some examples, the retransmission component 765 may be configured as or otherwise support a means for transmitting a message based on decoding the control information, where the message includes a retransmission of data from the UE.

In some examples, the addressing component 730 may be configured as or otherwise support a means for determining that the set of multiple control information segments are not addressed to the UE based on the remainder value being different from each integer value of the set of multiple integer values. In some examples, the control information decoder 760 may be configured as or otherwise support a means for refraining from decoding control information of the set of multiple control information segments based on determining that the set of multiple control information segments are not addressed to the UE.

In some examples, the flag bit component 745 may be configured as or otherwise support a means for identifying one or more flag bits included in the control message, the one or more flag bits indicating a format of a payload of the control message.

In some examples, different values of the one or more flag bits indicate different numbers of total bits associated with the control message. In some examples, the one or more flag bits indicate a number of control information segments of the set of multiple control information segments, a number of bits associated with the prime number, a number of bits associated with each integer value of the set of multiple integer values, or any combination thereof.

In some examples, the number of bits associated with each integer value is based on the number of bits associated with the prime number. In some examples, the prime number includes an index of the prime number in a prime number sequence. In some examples, the index of the prime number is from a pre-configured table including a set of multiple prime number indices. In some examples, a number of bits associated with the index of the prime number is less than a number of bits associated with the prime number. In some examples, the prime number sequence excludes one or more prime numbers that satisfy a threshold.

In some examples, the control message format component 750 may be configured as or otherwise support a means for determining a format for decoding the control message, where the format is from a set of two or more predefined formats. In some examples, to support determining the format used for encoding the control message, the control message format component 750 may be configured as or otherwise support a means for performing blind decoding of the control message to determine which format of the set of two or more predefined formats is the format used for encoding the control message. In some examples, the set of two or more predefined formats includes a first format corresponding to the control message having a first bit length, a second format corresponding to the control message having a second bit length greater than the first bit length, a third format corresponding to the control message having a first scrambling sequence, a fourth format corresponding to the control message having a second scrambling sequence different from the first scrambling sequence.

In some examples, the ID component 755 may be configured as or otherwise support a means for calculating the first integer value corresponding to the ID of the UE using a hashing function on a non-integer value that includes the ID of the UE. In some examples, the ID component 755 may be configured as or otherwise support a means for receiving a configuration of the group common control channel. In some examples, the ID component 755 may be configured as or otherwise support a means for identifying the hashing function based on the received configuration.

In some examples, the non-integer value includes a MAC address, or an IMSI, or any combination thereof. In some examples, the first integer value corresponding to the ID of the UE includes a RNTI. In some examples, each control information segment of the set of multiple control information segments includes a preconfigured number of bits of control information.

Figure 8:
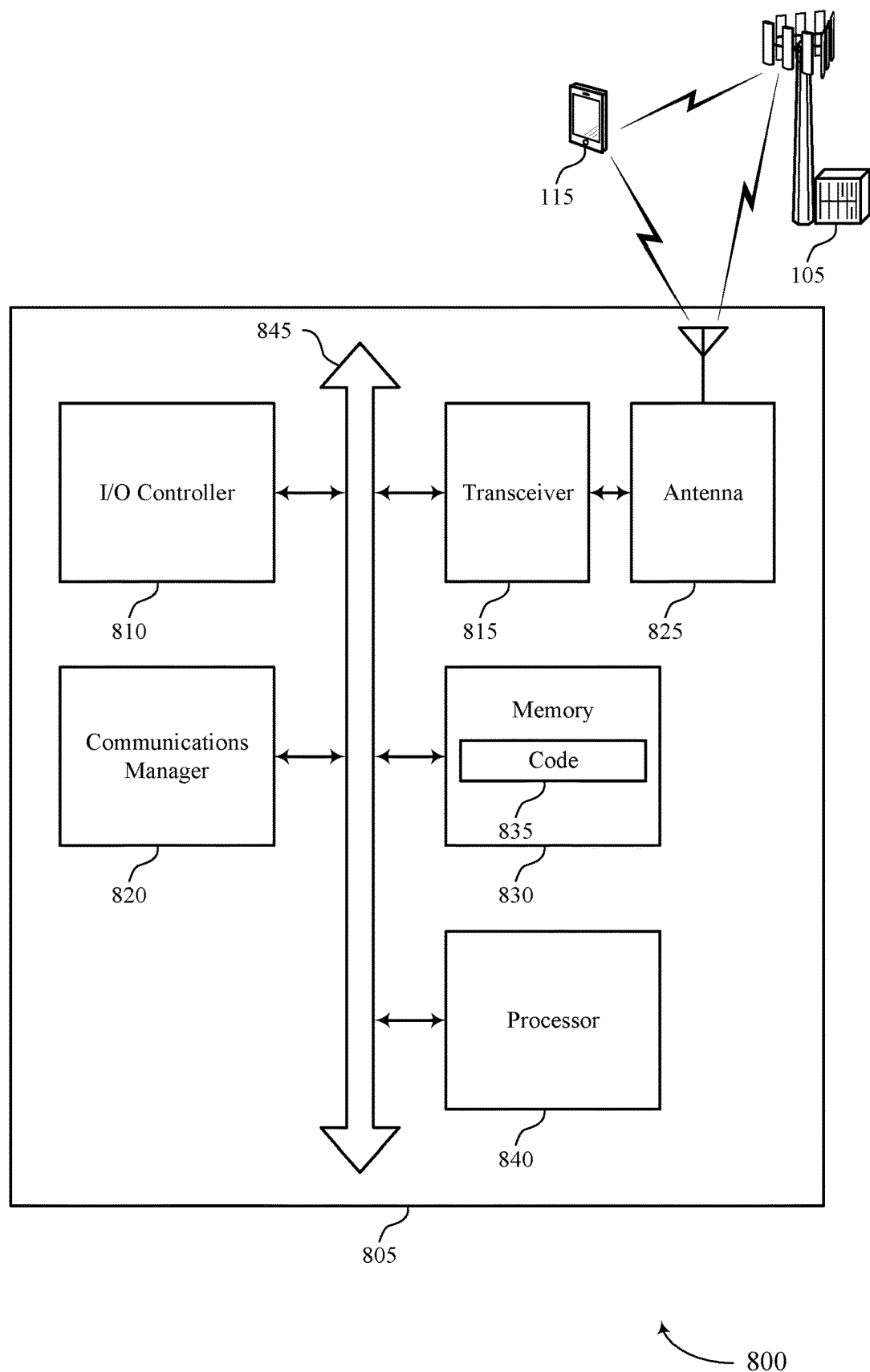
FIG. 8 shows a diagram of a system including a device that supports dynamic group common physical control channel assignment techniques in accordance with aspects of the present disclosure.

FIG. 8 shows a diagram of a system 800 including a device 805 that supports dynamic group common physical control channel assignment techniques in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic group common physical control channel assignment techniques). For example, the device 805 or a component of the device 805 may include a processor 840 and memory 830 coupled to the processor 840, the processor 840 and memory 830 configured to perform various functions described herein.

The communications manager 820 may support wireless communication by a UE in accordance with examples as disclosed herein. For example, the communications manager 820 may be configured as or otherwise support a means for receiving a control message via a group common control channel, the control message including a set of multiple control information segments for a set of UEs from a set of multiple UEs. The communications manager 820 may be configured as or otherwise support a means for identifying, within the control message, a prime number and a set of multiple integer values, each integer value of the set of multiple integer values being associated with respective control information segments of the set of multiple control information segments. The communications manager 820 may be configured as or otherwise support a means for processing the prime number, each integer value of the set of multiple integer values, and a first integer value corresponding to an ID of the UE to determine applicability of the control message to the UE.

By including or configuring the communications manager 820 in accordance with examples as described herein, the device 805 may support techniques for improved communication reliability, reduced latency, and reduced overhead for receiving and decoding control messages. For example, the device 805 (e.g., a UE 115) may be configured to determine applicability of a control information segment of a received control message to the device 805 based on the one or more values conveyed via the control message. By using the described techniques to determine applicability of a control message to the device 805, the device may refrain from decoding control information that is not addressed to the device 805, which may reduce latency and overhead of communications.

Additionally or alternatively, the device 805 may be configured to convert a non-integer value that may be an ID of the device 805 to an integer value representing an ID of the device 805 based on a hashing function. The device 805 may thereby reduce the number of bits associated with the ID of the device 805, which may reduce overhead associated with addressing the device and allow for more control information to be received by the device 805 and one or more other devices in a given control message.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of dynamic group common physical control channel assignment techniques as described herein, or the processor 840 and the memory 830 may be otherwise configured to perform or support such operations.

Figure 9:
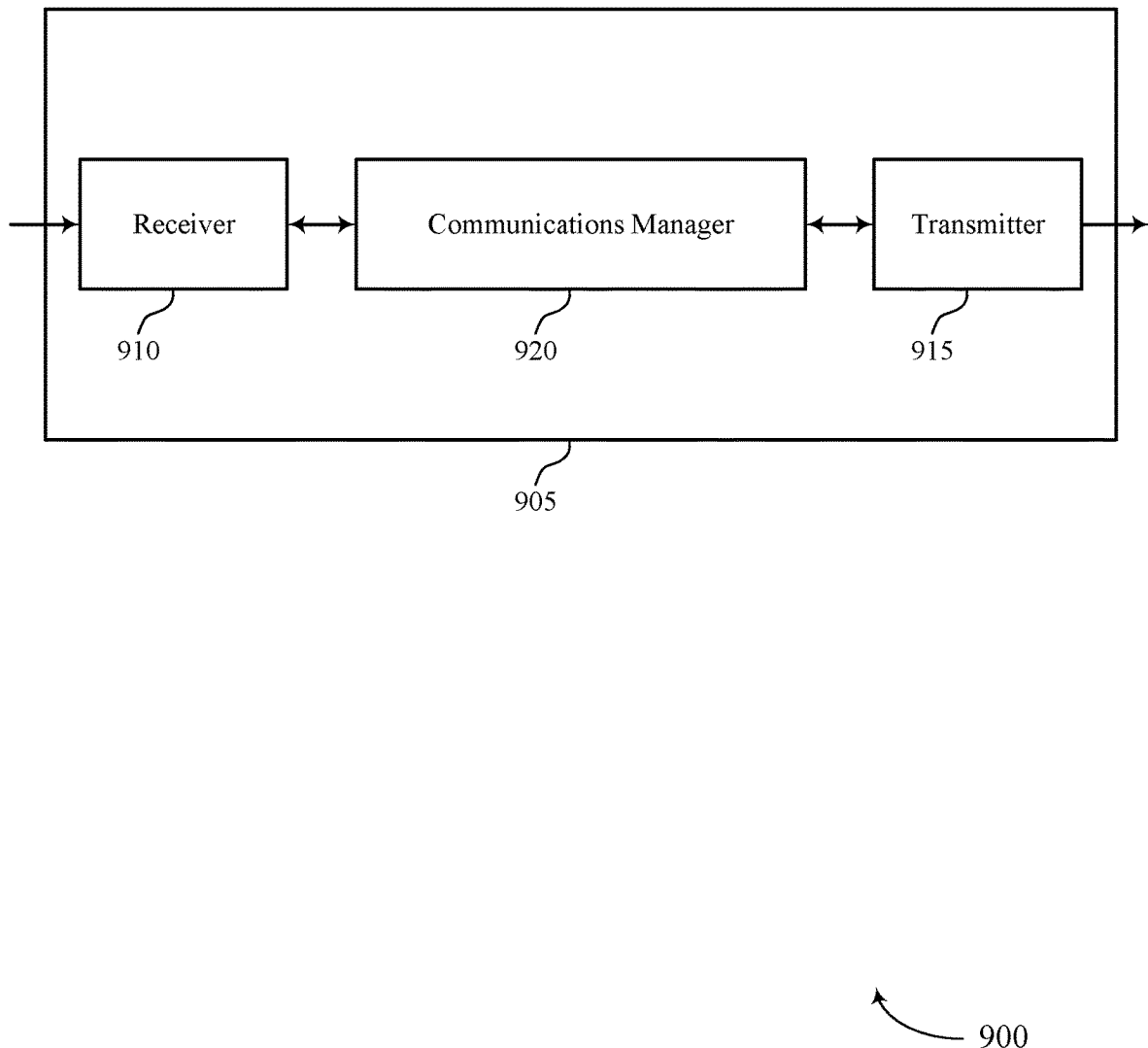
FIGS. 9 and 10 show block diagrams of devices that support dynamic group common physical control channel assignment techniques in accordance with aspects of the present disclosure.

FIG. 9 shows a block diagram 900 of a device 905 that supports dynamic group common physical control channel assignment techniques in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to dynamic group common physical control channel assignment techniques). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to dynamic group common physical control channel assignment techniques). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of dynamic group common physical control channel assignment techniques as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication by a base station in accordance with examples as disclosed herein. For example, the communications manager 920 may be configured as or otherwise support a means for generating a control message for a set of UEs from a set of multiple UEs, the control message including a set of multiple control information segments. The communications manager 920 may be configured as or otherwise support a means for selecting a set of multiple integer values and a prime number for inclusion in the control message based on the set of UEs, each integer value of the set of multiple integer values being associated with respective control information segments of the set of multiple control information segments, where the set of multiple integer values and the prime number are configured to address each UE of the set of UEs. The communications manager 920 may be configured as or otherwise support a means for transmitting, to at least the set of UEs, the control message including the set of multiple integer values and the prime number, the control message transmitted via a group common control channel.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources and reduced processing. For example, by addressing a set of target UEs 115 using the improved addressing techniques described herein, the processor of the device 905 (e.g., a base station 105) may user fewer bits for addressing the target UEs 115 than current techniques, and the processor may address a relatively large number of UEs 115 in a given control message. Addressing more UEs 115 in each control message may provide for more efficient utilization of communication resources and reduced processing by the device 905.

Figure 10:
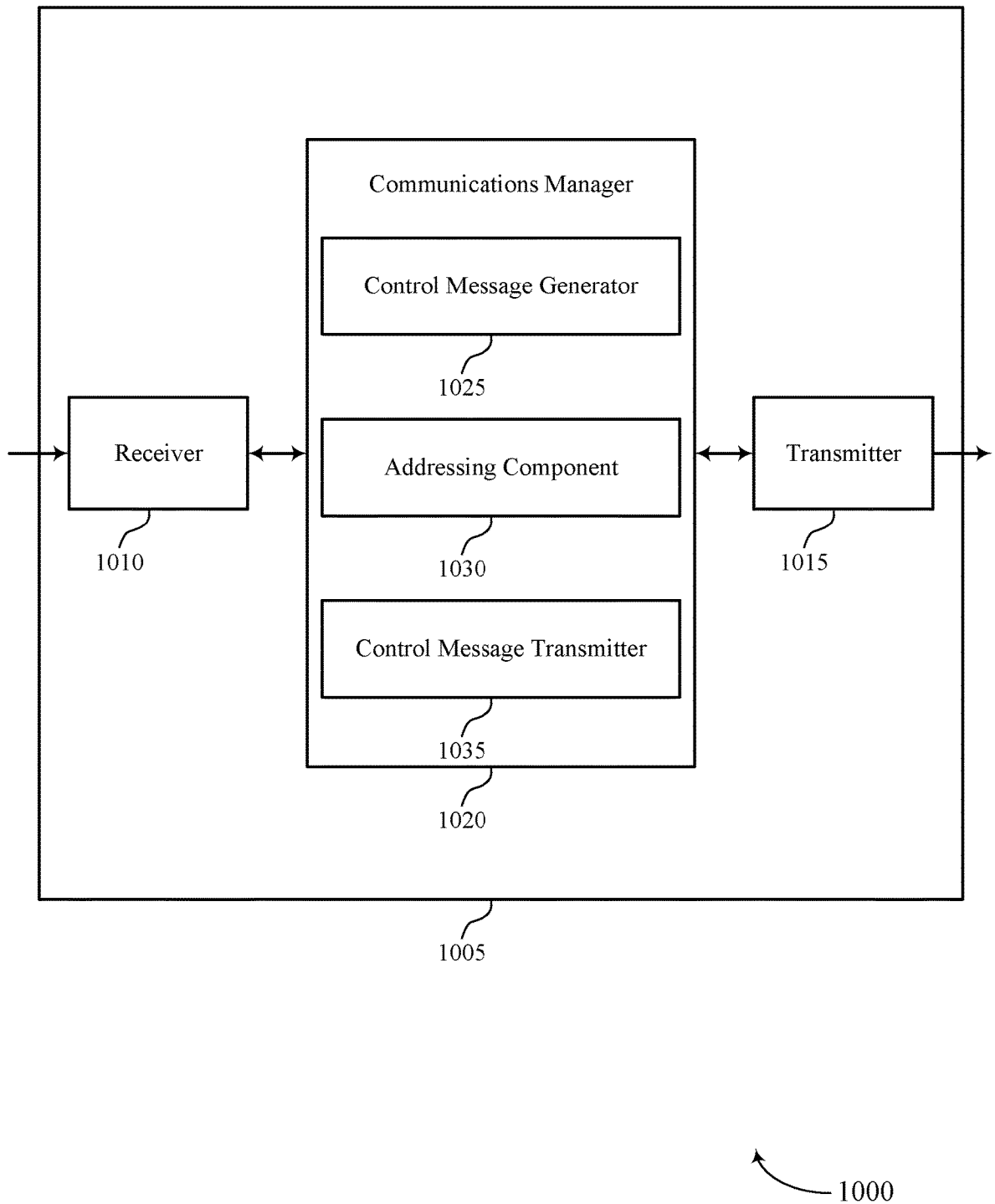

FIG. 10 shows a block diagram 1000 of a device 1005 that supports dynamic group common physical control channel assignment techniques in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to dynamic group common physical control channel assignment techniques). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to dynamic group common physical control channel assignment techniques). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of dynamic group common physical control channel assignment techniques as described herein. For example, the communications manager 1020 may include a control message generator 1025, an addressing component 1030, a control message transmitter 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication by a base station in accordance with examples as disclosed herein. The control message generator 1025 may be configured as or otherwise support a means for generating a control message for a set of UEs from a set of multiple UEs, the control message including a set of multiple control information segments. The addressing component 1030 may be configured as or otherwise support a means for selecting a set of multiple integer values and a prime number for inclusion in the control message based on the set of UEs, each integer value of the set of multiple integer values being associated with respective control information segments of the set of multiple control information segments, where the set of multiple integer values and the prime number are configured to address each UE of the set of UEs. The control message transmitter 1035 may be configured as or otherwise support a means for transmitting, to at least the set of UEs, the control message including the set of multiple integer values and the prime number, the control message transmitted via a group common control channel.

Figure 11:
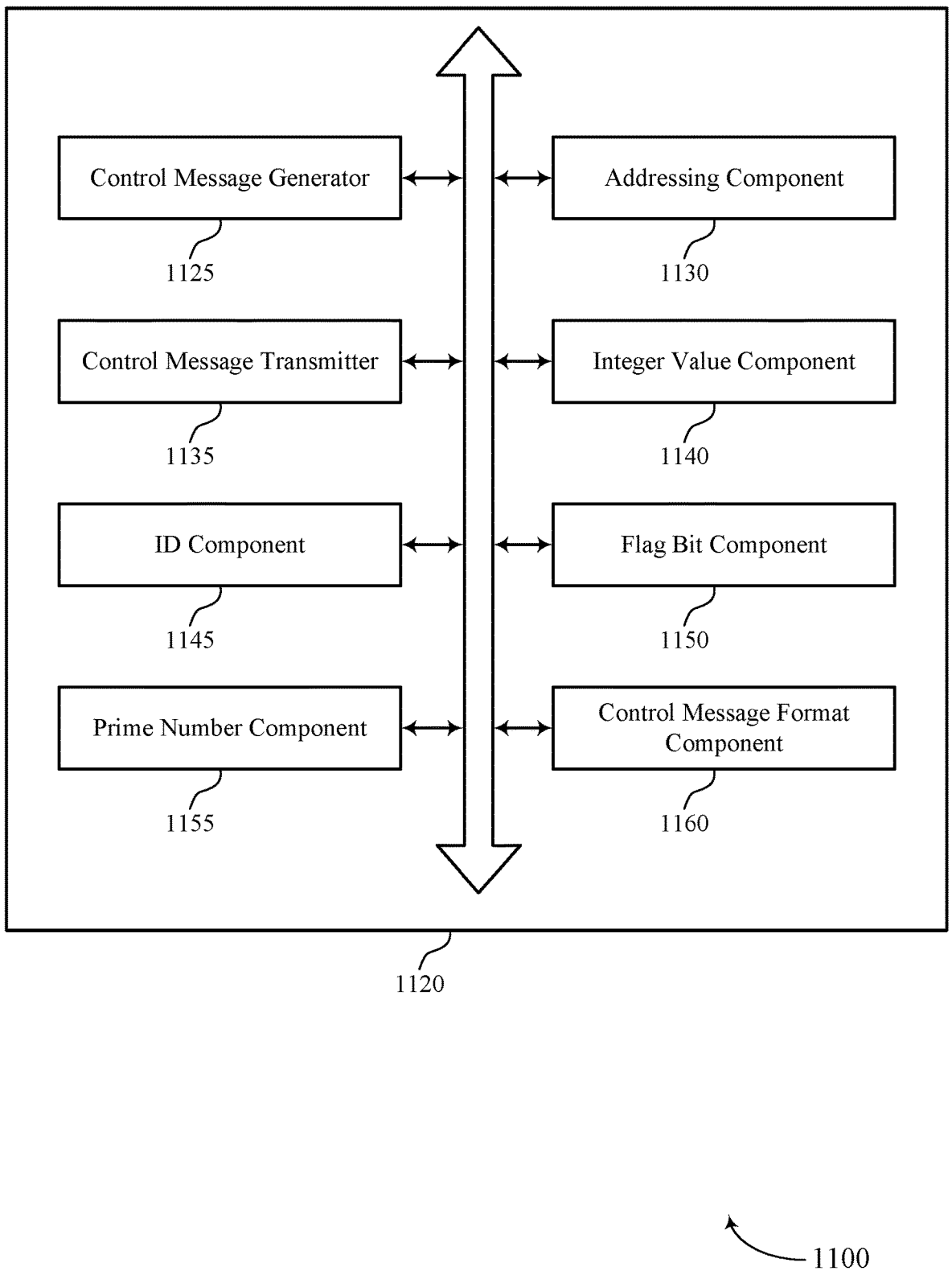
FIG. 11 shows a block diagram of a communications manager that supports dynamic group common physical control channel assignment techniques in accordance with aspects of the present disclosure.

FIG. 11 shows a block diagram 1100 of a communications manager 1120 that supports dynamic group common physical control channel assignment techniques in accordance with aspects of the present disclosure. The communications manager 1120 may be an example of aspects of a communications manager 920, a communications manager 1020, or both, as described herein. The communications manager 1120, or various components thereof, may be an example of means for performing various aspects of dynamic group common physical control channel assignment techniques as described herein. For example, the communications manager 1120 may include a control message generator 1125, an addressing component 1130, a control message transmitter 1135, an integer value component 1140, an ID component 1145, a flag bit component 1150, a prime number component 1155, a control message format component 1160, or any combination thereof. Each of these components may communicate, directly or indirectly, with one another (e.g., via one or more buses).

The communications manager 1120 may support wireless communication by a base station in accordance with examples as disclosed herein. The control message generator 1125 may be configured as or otherwise support a means for generating a control message for a set of UEs from a set of multiple UEs, the control message including a set of multiple control information segments. The addressing component 1130 may be configured as or otherwise support a means for selecting a set of multiple integer values and a prime number for inclusion in the control message based on the set of UEs, each integer value of the set of multiple integer values being associated with respective control information segments of the set of multiple control information segments, where the set of multiple integer values and the prime number are configured to address each UE of the set of UEs. The control message transmitter 1135 may be configured as or otherwise support a means for transmitting, to at least the set of UEs, the control message including the set of multiple integer values and the prime number, the control message transmitted via a group common control channel.

In some examples, to support selecting the set of multiple integer values, the integer value component 1140 may be configured as or otherwise support a means for identifying respective integer values corresponding to IDs of each UE of the set of UEs. In some examples, to support selecting the set of multiple integer values, the ID component 1145 may be configured as or otherwise support a means for determining the set of multiple integer values based on the respective integer values corresponding to the IDs of each UE.

In some examples, to support determining the set of multiple integer values, the integer value component 1140 may be configured as or otherwise support a means for determining the set of multiple integer values based on respective remainder values from modulo operations being equal to each integer value of the set of multiple integer values, the modulo operations including the prime number and the respective integer values corresponding to the IDs of each UE.

In some examples, the integer value component 1140 may be configured as or otherwise support a means for determining a first integer value corresponding to an ID of a first UE from the set of UEs, where the first integer value is determined based on a non-integer value of the first UE and a hashing function. In some examples, the integer value component 1140 may be configured as or otherwise support a means for transmitting a configuration of the group common control channel to the first UE, where the configuration indicates the hashing function.

In some examples, the non-integer value includes a MAC address, or an IMSI, or any combination thereof. In some examples, respective integer values corresponding to the IDs of each UE includes RNTIs.

In some examples, the flag bit component 1150 may be configured as or otherwise support a means for selecting one or more flag bits that indicate a format of the control message, where the control message includes the one or more flag bits.

In some examples, the prime number component 1155 may be configured as or otherwise support a means for identifying one or more prime numbers of a first set of prime numbers, the first set of prime numbers corresponding to a first bit value of the one or more flag bits, where selecting the prime number is based on determining whether the one or more prime numbers from the first set of prime numbers satisfy a rule.

In some examples, the prime number component 1155 may be configured as or otherwise support a means for determining that the one or more prime numbers of the first set of prime numbers do not satisfy the rule. In some examples, the prime number component 1155 may be configured as or otherwise support a means for identifying one or more additional prime numbers of a second set of prime numbers that is different from the first set of prime numbers, the second set of prime numbers corresponding to a second bit value of the one or more flag bits, where selecting the prime number is based on determining whether the one or more prime numbers from the second set of prime numbers satisfy the rule.

In some examples, the first set of prime numbers corresponds to a first set of UEs of the set of multiple UEs. In some examples, the second set of prime numbers corresponds to a second set of UEs of the set of multiple UEs, the second set of UEs having a fewer number of UEs than the first set of UEs.

In some examples, different values of the one or more flag bits indicate different numbers of total bits associated with the control message. In some examples, the one or more flag bits indicate a number of control information segments of the set of multiple control information segments, a number of bits associated with the prime number, a number of bits associated with each integer value of the set of multiple integer values, or any combination thereof. In some examples, the number of bits associated with each integer value is based on the number of bits associated with the prime number.

In some examples, to support selecting the prime number, the prime number component 1155 may be configured as or otherwise support a means for selecting an index of the prime number in a prime number sequence, where the prime number included in the control message includes the index of the prime number. In some examples, the index of the prime number is from a pre-configured table including a set of multiple prime number indices. In some examples, a number of bits associated with the index of the prime number is less than a number of bits associated with the prime number. In some examples, the prime number sequence excludes one or more prime numbers that satisfy a prime number threshold.

In some examples, the prime number is selected based on a one-to-one function for the set of UEs.

In some examples, the control message format component 1160 may be configured as or otherwise support a means for determining a format for the control message, where the format is from a set of two or more predefined formats. In some examples, the control message format component 1160 may be configured as or otherwise support a means for encoding the control message based on the format.

In some examples, the set of two or more predefined formats includes a first format corresponding to the control message having a first bit length, a second format corresponding to the control message having a second bit length greater than the first bit length, a third format corresponding to the control message having a first scrambling sequence, a fourth format corresponding to the control message having a second scrambling sequence different from the first scrambling sequence.

Figure 12:
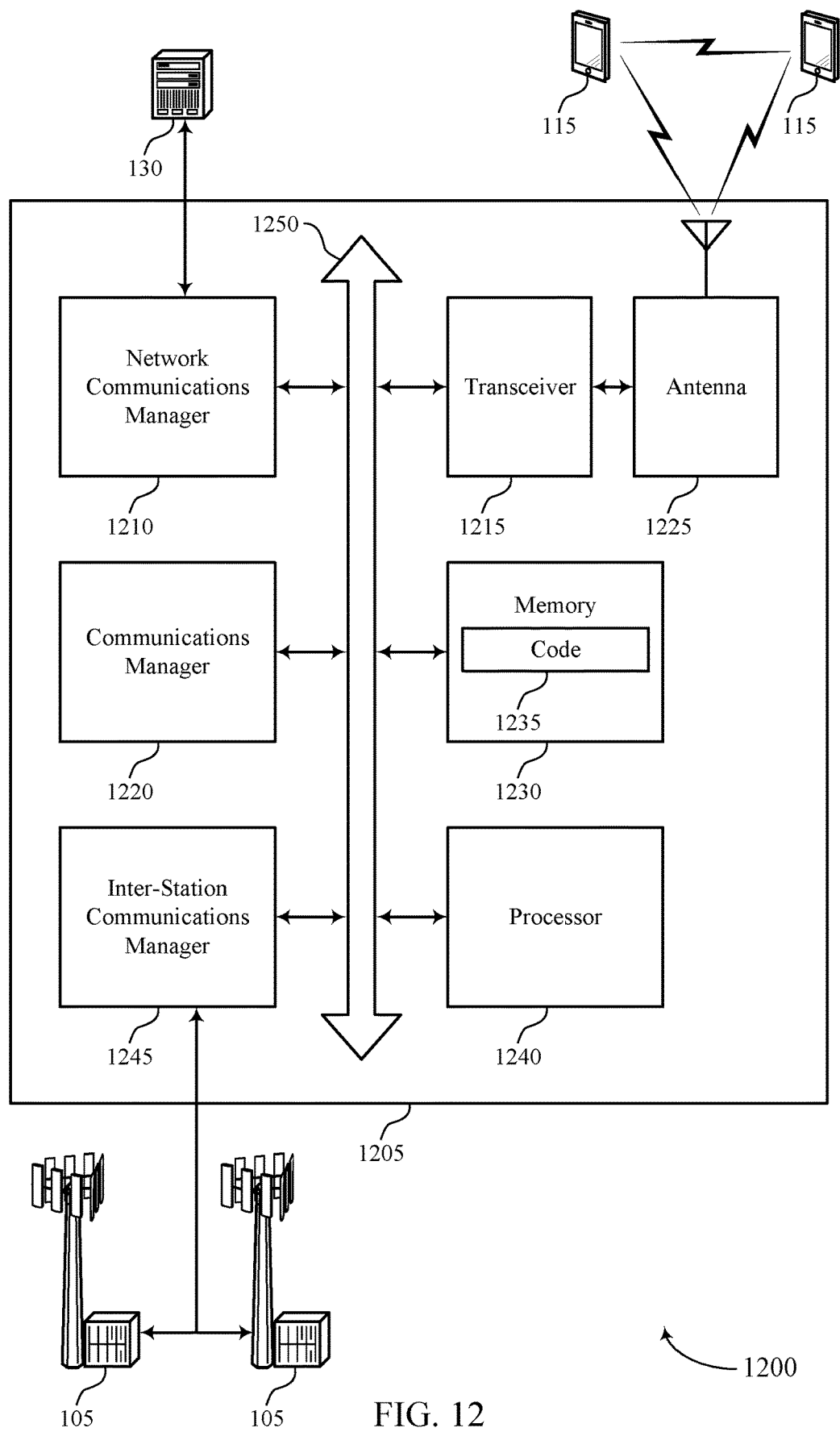
FIG. 12 shows a diagram of a system including a device that supports dynamic group common physical control channel assignment techniques in accordance with aspects of the present disclosure.

FIG. 12 shows a diagram of a system 1200 including a device 1205 that supports dynamic group common physical control channel assignment techniques in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic group common physical control channel assignment techniques). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication by a base station in accordance with examples as disclosed herein. For example, the communications manager 1220 may be configured as or otherwise support a means for generating a control message for a set of UEs from a set of multiple UEs, the control message including a set of multiple control information segments. The communications manager 1220 may be configured as or otherwise support a means for selecting a set of multiple integer values and a prime number for inclusion in the control message based on the set of UEs, each integer value of the set of multiple integer values being associated with respective control information segments of the set of multiple control information segments, where the set of multiple integer values and the prime number are configured to address each UE of the set of UEs. The communications manager 1220 may be configured as or otherwise support a means for transmitting, to at least the set of UEs, the control message including the set of multiple integer values and the prime number, the control message transmitted via a group common control channel.

By including or configuring the communications manager 1220 in accordance with examples as described herein, the device 1205 may support techniques for improved communication reliability, reduced latency, and improved coordination between devices. For example, by addressing a set of target UEs 115 using the described addressing techniques, the device 1205 (e.g., a base station 105) may address the UEs 115 with improved accuracy based on calculating integer values for addressing each UE 115. The described techniques may thereby provide for improved coordination between devices and improved communication reliability.

Additionally or alternatively, by addressing the UEs 115 using the prime number and calculated integer values, the device 1205 may use fewer bits for addressing the UEs 115 in the control message than current techniques. By using fewer bits for addressing, the device 1205 may address more UEs 115 in a given control message than current techniques, which may reduce latency and improve communication reliability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of dynamic group common physical control channel assignment techniques as described herein, or the processor 1240 and the memory 1230 may be otherwise configured to perform or support such operations.

Figure 13:
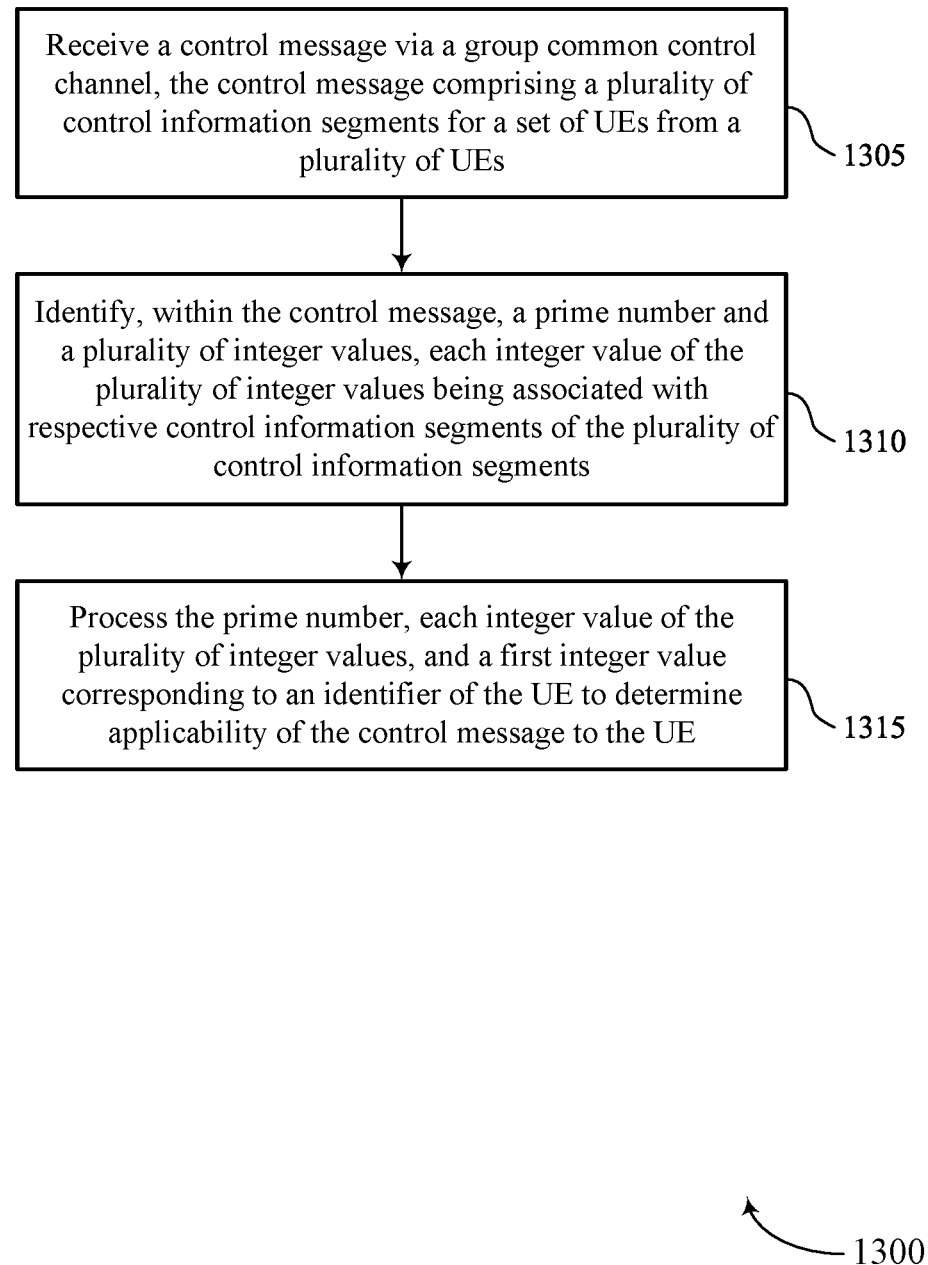
FIGS. 13 through 16 show flowcharts illustrating methods that support dynamic group common physical control channel assignment techniques in accordance with aspects of the present disclosure.

FIG. 13 shows a flowchart illustrating a method 1300 that supports dynamic group common physical control channel assignment techniques in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a control message via a group common control channel, the control message including a set of multiple control information segments for a set of UEs from a set of multiple UEs. The operations of 1305 may be performed in accordance with examples as disclosed herein. In some examples, aspects of the operations of 1305 may be performed by a control message receiver 725 as described with reference to FIG. 7.

At 1310, the method may include identifying, within the control message, a prime number and a set of multiple integer values, each integer value of the set of multiple integer values being associated with respective control information segments of the set of multiple control information segments. The operations of 1310 may be performed in accordance with examples as disclosed herein. In some examples, aspects of the operations of 1310 may be performed by an addressing component 730 as described with reference to FIG. 7.

At 1315, the method may include processing the prime number, each integer value of the set of multiple integer values, and a first integer value corresponding to an ID of the UE to determine applicability of the control message to the UE. The operations of 1315 may be performed in accordance with examples as disclosed herein. In some examples, aspects of the operations of 1315 may be performed by a control message processing component 735 as described with reference to FIG. 7.

Figure 14:
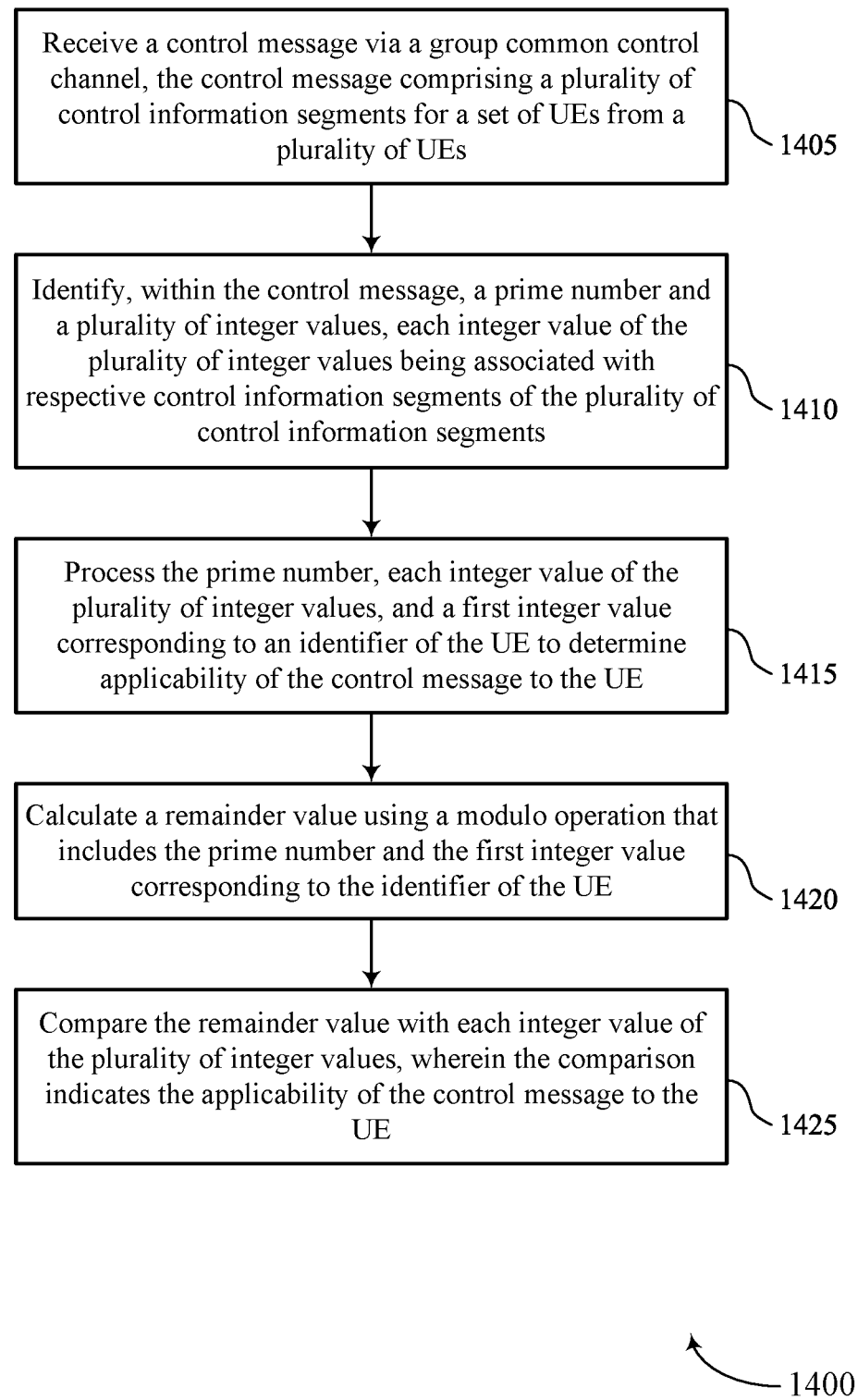

FIG. 14 shows a flowchart illustrating a method 1400 that supports dynamic group common physical control channel assignment techniques in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving a control message via a group common control channel, the control message including a set of multiple control information segments for a set of UEs from a set of multiple UEs. The operations of 1405 may be performed in accordance with examples as disclosed herein. In some examples, aspects of the operations of 1405 may be performed by a control message receiver 725 as described with reference to FIG. 7.

At 1410, the method may include identifying, within the control message, a prime number and a set of multiple integer values, each integer value of the set of multiple integer values being associated with respective control information segments of the set of multiple control information segments. The operations of 1410 may be performed in accordance with examples as disclosed herein. In some examples, aspects of the operations of 1410 may be performed by an addressing component 730 as described with reference to FIG. 7.

At 1415, the method may include processing the prime number, each integer value of the set of multiple integer values, and a first integer value corresponding to an ID of the UE to determine applicability of the control message to the UE. The operations of 1415 may be performed in accordance with examples as disclosed herein. In some examples, aspects of the operations of 1415 may be performed by a control message processing component 735 as described with reference to FIG. 7.

At 1420, the method may include calculating a remainder value using a modulo operation that includes the prime number and the first integer value corresponding to the ID of the UE. The operations of 1420 may be performed in accordance with examples as disclosed herein. In some examples, aspects of the operations of 1420 may be performed by a remainder value component 740 as described with reference to FIG. 7.

At 1425, the method may include comparing the remainder value with each integer value of the set of multiple integer values, where the comparison indicates the applicability of the control message to the UE. The operations of 1425 may be performed in accordance with examples as disclosed herein. In some examples, aspects of the operations of 1425 may be performed by an addressing component 730 as described with reference to FIG. 7.

Figure 15:
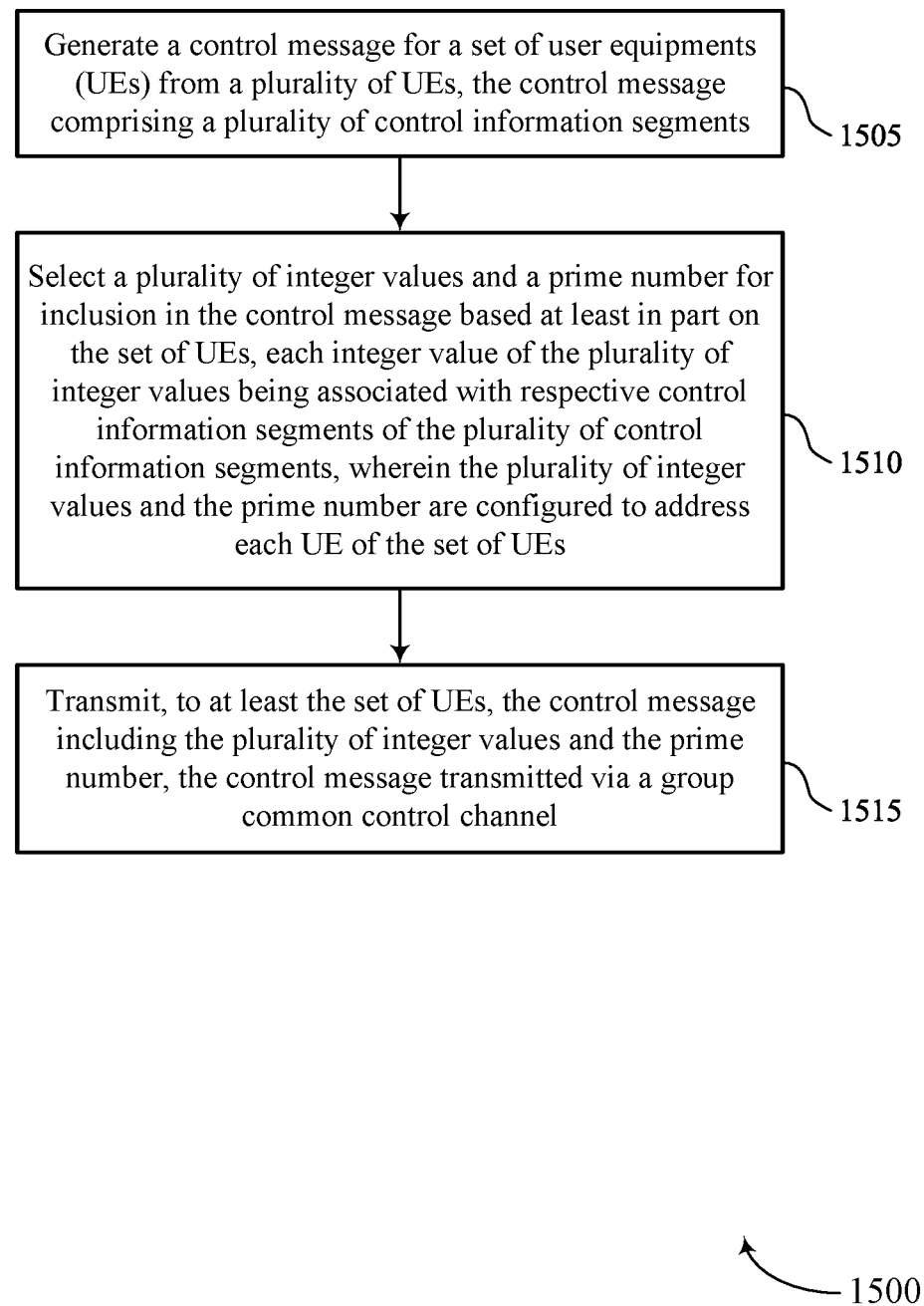

FIG. 15 shows a flowchart illustrating a method 1500 that supports dynamic group common physical control channel assignment techniques in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include generating a control message for a set of UEs from a set of multiple UEs, the control message including a set of multiple control information segments. The operations of 1505 may be performed in accordance with examples as disclosed herein. In some examples, aspects of the operations of 1505 may be performed by a control message generator 1125 as described with reference to FIG. 11.

At 1510, the method may include selecting a set of multiple integer values and a prime number for inclusion in the control message based on the set of UEs, each integer value of the set of multiple integer values being associated with respective control information segments of the set of multiple control information segments, where the set of multiple integer values and the prime number are configured to address each UE of the set of UEs. The operations of 1510 may be performed in accordance with examples as disclosed herein. In some examples, aspects of the operations of 1510 may be performed by an addressing component 1130 as described with reference to FIG. 11.

At 1515, the method may include transmitting, to at least the set of UEs, the control message including the set of multiple integer values and the prime number, the control message transmitted via a group common control channel. The operations of 1515 may be performed in accordance with examples as disclosed herein. In some examples, aspects of the operations of 1515 may be performed by a control message transmitter 1135 as described with reference to FIG. 11.

Figure 16:
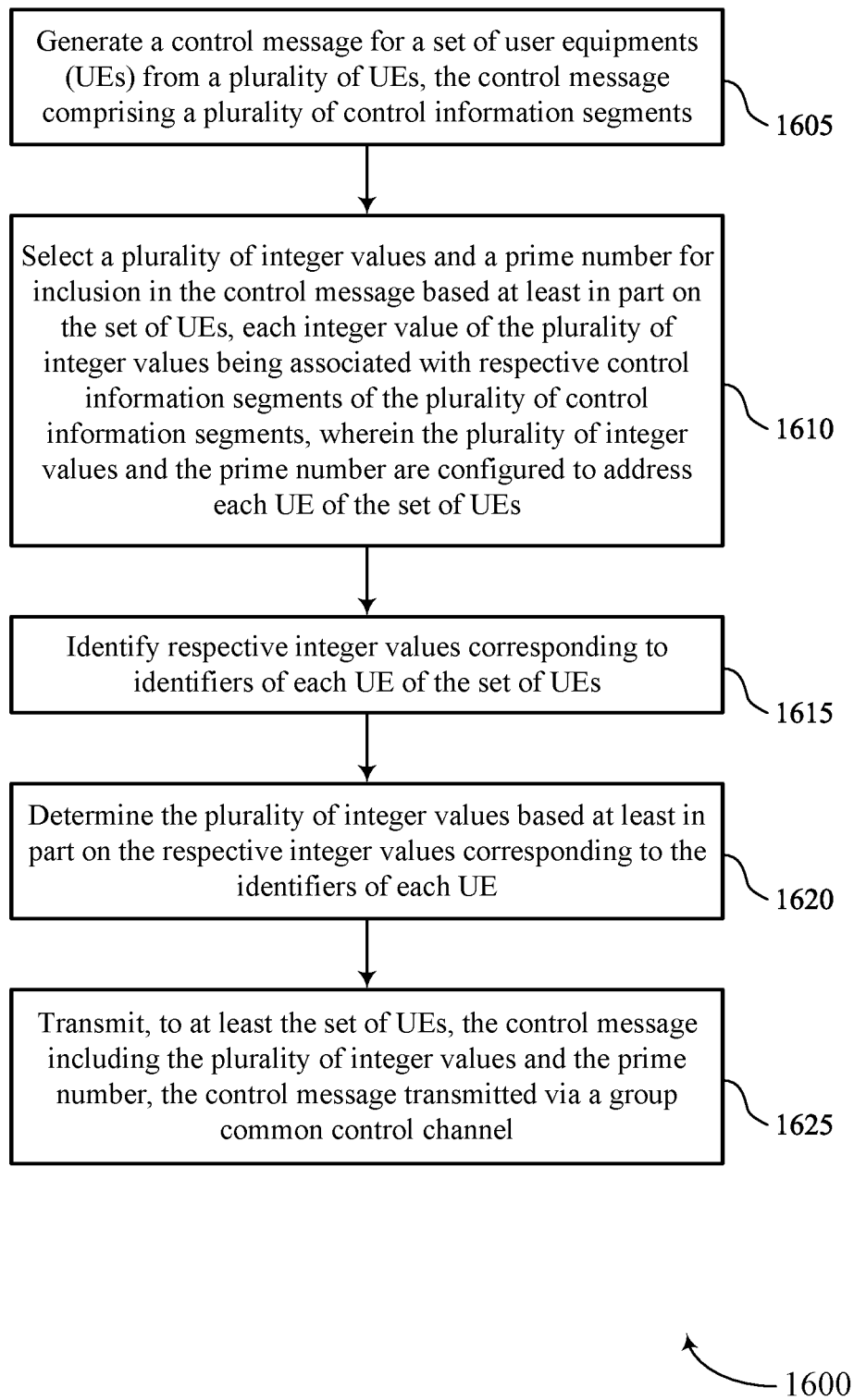

FIG. 16 shows a flowchart illustrating a method 1600 that supports dynamic group common physical control channel assignment techniques in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include generating a control message for a set of UEs from a set of multiple UEs, the control message including a set of multiple control information segments. The operations of 1605 may be performed in accordance with examples as disclosed herein. In some examples, aspects of the operations of 1605 may be performed by a control message generator 1125 as described with reference to FIG. 11.

At 1610, the method may include selecting a set of multiple integer values and a prime number for inclusion in the control message based on the set of UEs, each integer value of the set of multiple integer values being associated with respective control information segments of the set of multiple control information segments, where the set of multiple integer values and the prime number are configured to address each UE of the set of UEs. The operations of 1610 may be performed in accordance with examples as disclosed herein. In some examples, aspects of the operations of 1610 may be performed by an addressing component 1130 as described with reference to FIG. 11.

At 1615, the method may include identifying respective integer values corresponding to IDs of each UE of the set of UEs. The operations of 1615 may be performed in accordance with examples as disclosed herein. In some examples, aspects of the operations of 1615 may be performed by an integer value component 1140 as described with reference to FIG. 11.

At 1620, the method may include determining the set of multiple integer values based on the respective integer values corresponding to the IDs of each UE. The operations of 1620 may be performed in accordance with examples as disclosed herein. In some examples, aspects of the operations of 1620 may be performed by an ID component 1145 as described with reference to FIG. 11.

At 1625, the method may include transmitting, to at least the set of UEs, the control message including the set of multiple integer values and the prime number, the control message transmitted via a group common control channel. The operations of 1625 may be performed in accordance with examples as disclosed herein. In some examples, aspects of the operations of 1625 may be performed by a control message transmitter 1135 as described with reference to FIG. 11.

The following provides an overview of aspects of the present disclosure:

Aspect 1: A method for wireless communication by a UE, comprising: receiving a control message via a group common control channel, the control message comprising a plurality of control information segments for a set of UEs from a plurality of UEs; identifying, within the control message, a prime number and a plurality of integer values, each integer value of the plurality of integer values being associated with respective control information segments of the plurality of control information segments; and processing the prime number, each integer value of the plurality of integer values, and a first integer value corresponding to an ID of the UE to determine applicability of the control message to the UE.

Aspect 2: The method of aspect 1, wherein processing the prime number, each integer value, and the first integer value comprises: calculating a remainder value using a modulo operation that includes the prime number and the first integer value corresponding to the ID of the UE; and comparing the remainder value with each integer value of the plurality of integer values, wherein the comparison indicates the applicability of the control message to the UE.

Aspect 3: The method of any of aspects 1 and 2, further comprising: determining that a first control information segment of the plurality of control information segments is addressed to the UE based at least in part on the remainder value being the same as an integer value of the plurality of integer values, wherein the integer value is associated with the first control information segment; and decoding control information from the first control information segment based at least in part on determining that the first control information segment is addressed to the UE.

Aspect 4: The method of aspect 3, further comprising: transmitting a message based at least in part on decoding the control information, wherein the message comprises a retransmission of data from the UE.

Aspect 5: The method of any of aspects 1 and 2, further comprising: determining that the plurality of control information segments are not addressed to the UE based at least in part on the remainder value being different from each integer value of the plurality of integer values; and refraining from decoding control information of the plurality of control information segments based at least in part on determining that the plurality of control information segments are not addressed to the UE.

Aspect 6: The method of any of aspects 1 through 5, further comprising: identifying one or more flag bits included in the control message, the one or more flag bits indicating a format of a payload of the control message.

Aspect 7: The method of aspect 6, wherein: the one or more flag bits indicate a number of control information segments of the plurality of control information segments, a number of bits associated with the prime number, a number of bits associated with each integer value of the plurality of integer values, or any combination thereof; and different values of the one or more flag bits indicate different numbers of total bits associated with the control message.

Aspect 8: The method of aspect 7, wherein the number of bits associated with each integer value is based at least in part on the number of bits associated with the prime number.

Aspect 9: The method of any of aspects 1 through 8, wherein: the prime number comprises an index of the prime number in a prime number sequence; the index of the prime number is from a pre-configured table comprising a plurality of prime number indices; and a number of bits associated with the index of the prime number is less than a number of bits associated with the prime number.

Aspect 10: The method of aspect 9, wherein the prime number sequence excludes one or more prime numbers that satisfy a threshold.

Aspect 11: The method of any of aspects 1 through 10, further comprising: determining a format for decoding the control message, wherein the format is from a set of two or more predefined formats.

Aspect 12: The method of any of aspects 1 through 11, further comprising: performing blind decoding of the control message to determine which format of a set of two or more predefined formats is a format used for encoding the control message; and decoding the control message based at least in part on the format used for encoding the control message.

Aspect 13: The method of aspect 12, wherein the set of two or more predefined formats comprises a first format corresponding to the control message having a first bit length, a second format corresponding to the control message having a second bit length greater than the first bit length, a third format corresponding to the control message having a first scrambling sequence, a fourth format corresponding to the control message having a second scrambling sequence different from the first scrambling sequence.

Aspect 14: The method of any of aspects 1 through 13, further comprising: receiving a configuration of the group common control channel; identifying a hashing function based at least in part on the received configuration; and calculating the first integer value corresponding to the ID of the UE using the hashing function on a non-integer value that comprises the ID of the UE.

Aspect 15: The method of aspect 14, wherein the non-integer value comprises a MAC address, or an IMSI, or any combination thereof.

Aspect 16: The method of any of aspects 1 through 15, wherein the first integer value corresponding to the ID of the UE comprises a RNTI.

Aspect 17: The method of any of aspects 1 through 16, wherein each control information segment of the plurality of control information segments comprises a preconfigured number of bits of control information.

Aspect 18: A method for wireless communication by a base station, comprising: generating a control message for a set of UEs from a plurality of UEs, the control message comprising a plurality of control information segments; selecting a plurality of integer values and a prime number for inclusion in the control message based at least in part on the set of UEs, each integer value of the plurality of integer values being associated with respective control information segments of the plurality of control information segments, wherein the plurality of integer values and the prime number are configured to address each UE of the set of UEs; and transmitting, to at least the set of UEs, the control message including the plurality of integer values and the prime number, the control message transmitted via a group common control channel.

Aspect 19: The method of aspect 18, wherein selecting the plurality of integer values comprises: identifying respective integer values corresponding to IDs of each UE of the set of UEs; and determining the plurality of integer values based at least in part on the respective integer values corresponding to the IDs of each UE.

Aspect 20: The method of aspect 19, wherein determining the plurality of integer values comprises: determining the plurality of integer values based at least in part on respective remainder values from modulo operations being equal to each integer value of the plurality of integer values, the modulo operations including the prime number and the respective integer values corresponding to the IDs of each UE.

Aspect 21: The method of any of aspects 19 through 20, further comprising: determining a first integer value corresponding to an ID of a first UE from the set of UEs, wherein the first integer value is determined based at least in part on a non-integer value of the first UE and a hashing function; and transmitting a configuration of the group common control channel to the first UE, wherein the configuration indicates the hashing function.

Aspect 22: The method of aspect 21, wherein the non-integer value comprises a MAC address, or an IMSI, or any combination thereof.

Aspect 23: The method of any of aspects 19 through 22, wherein respective integer values corresponding to the IDs of each UE comprises RNTIs.

Aspect 24: The method of any of aspects 18 through 23, further comprising: selecting one or more flag bits that indicate a format of the control message, wherein the control message includes the one or more flag bits.

Aspect 25: The method of aspect 24, further comprising: identifying one or more prime numbers of a first set of prime numbers, the first set of prime numbers corresponding to a first bit value of the one or more flag bits, wherein selecting the prime number is based at least in part on determining whether the one or more prime numbers from the first set of prime numbers satisfy a rule.

Aspect 26: The method of aspect 25, further comprising: determining that the one or more prime numbers of the first set of prime numbers do not satisfy the rule; and identifying one or more additional prime numbers of a second set of prime numbers that is different from the first set of prime numbers, the second set of prime numbers corresponding to a second bit value of the one or more flag bits, wherein selecting the prime number is based at least in part on determining whether the one or more prime numbers from the second set of prime numbers satisfy the rule.

Aspect 27: The method of aspect 26, wherein the first set of prime numbers corresponds to a first set of UEs of the plurality of UEs; and the second set of prime numbers corresponds to a second set of UEs of the plurality of UEs, the second set of UEs having a fewer number of UEs than the first set of UEs.

Aspect 28: The method of any of aspects 24 through 27, wherein: the one or more flag bits indicate a number of control information segments of the plurality of control information segments, a number of bits associated with the prime number, a number of bits associated with each integer value of the plurality of integer values, or any combination thereof; and different values of the one or more flag bits indicate different numbers of total bits associated with the control message.

Aspect 29: The method of aspect 28, wherein the number of bits associated with each integer value is based at least in part on the number of bits associated with the prime number.

Aspect 30: The method of any of aspects 18 through 29, wherein selecting the prime number comprises: selecting an index of the prime number in a prime number sequence, wherein the prime number included in the control message comprises the index of the prime number.

Aspect 31: The method of aspect 30, wherein the index of the prime number is from a pre-configured table comprising a plurality of prime number indices.

Aspect 32: The method of any of aspects 30 through 31, wherein a number of bits associated with the index of the prime number is less than a number of bits associated with the prime number.

Aspect 33: The method of any of aspects 30 through 32, wherein the prime number sequence excludes one or more prime numbers that satisfy a prime number threshold.

Aspect 34: The method of any of aspects 18 through 33, further comprising: determining a format for the control message, wherein the format is from a set of two or more pre-defined formats; and encoding the control message based at least in part on the format.

Aspect 35: The method of aspect 34, wherein the set of two or more pre-defined formats comprises a first format corresponding to the control message having a first bit length, a second format corresponding to the control message having a second bit length greater than the first bit length, a third format corresponding to the control message having a first scrambling sequence, a fourth format corresponding to the control message having a second scrambling sequence different from the first scrambling sequence.

Aspect 36: The method of any of aspects 18 through 35, wherein the prime number is selected based on a one-to-one function for the set of UEs.

Aspect 37: An apparatus for wireless communication by a UE, comprising a processor; memory coupled with the processor; and instructions stored in the memory and executable by the processor to cause the apparatus to perform a method of any of aspects 1 through 17.

Aspect 38: An apparatus for wireless communication by a UE, comprising at least one means for performing a method of any of aspects 1 through 17.

Aspect 39: A non-transitory computer-readable medium storing code for wireless communication by a UE, the code comprising instructions executable by a processor to perform a method of any of aspects 1 through 17.

Aspect 40: An apparatus for wireless communication by a base station, comprising a processor; memory coupled with the processor; and instructions stored in the memory and executable by the processor to cause the apparatus to perform a method of any of aspects 18 through 36.

Aspect 41: An apparatus for wireless communication by a base station, comprising at least one means for performing a method of any of aspects 18 through 36.

Aspect 42: A non-transitory computer-readable medium storing code for wireless communication by a base station, the code comprising instructions executable by a processor to perform a method of any of aspects 18 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), IEEE 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication by a user equipment (UE), comprising:
    receiving a control message via a group common control channel, the control message comprising a plurality of control information segments for a set of UEs from a plurality of UEs;
    identifying, within the control message, a prime number and a plurality of integer values, each integer value of the plurality of integer values being associated with respective control information segments of the plurality of control information segments; and
    processing the prime number, each integer value of the plurality of integer values, and a first integer value corresponding to an identifier of the UE to determine applicability of the control message to the UE.

2. The method of claim 1, processing the prime number, each integer value, and the first integer value comprises:
    calculating a remainder value using a modulo operation that includes the prime number and the first integer value corresponding to the identifier of the UE; and
    comparing the remainder value with each integer value of the plurality of integer values, wherein the comparison indicates the applicability of the control message to the UE.

3. The method of claim 2, further comprising:
    determining that a first control information segment of the plurality of control information segments is addressed to the UE based at least in part on the remainder value being the same as an integer value of the plurality of integer values, wherein the integer value is associated with the first control information segment; and
    decoding control information from the first control information segment based at least in part on determining that the first control information segment is addressed to the UE.

4. The method of claim 2, further comprising:
    determining that the plurality of control information segments are not addressed to the UE based at least in part on the remainder value being different from each integer value of the plurality of integer values; and refraining from decoding control information of the plurality of control information segments based at least in part on determining that the plurality of control information segments are not addressed to the UE.

5. The method of claim 1, further comprising:
identifying one or more flag bits included in the control message, the one or more flag bits indicating a format of a payload of the control message.

6. The method of claim 5, wherein:
the one or more flag bits indicate a number of control information segments of the plurality of control information segments, a number of bits associated with the prime number, a number of bits associated with each integer value of the plurality of integer values, or any combination thereof; and different values of the one or more flag bits indicate different numbers of total bits associated with the control message.

7. The method of claim 6, wherein the number of bits associated with each integer value is based at least in part on the number of bits associated with the prime number.

8. The method of claim 1, wherein:
the prime number comprises an index of the prime number in a prime number sequence;
the index of the prime number is from a pre-configured table comprising a plurality of prime number indices; and
a number of bits associated with the index of the prime number is less than a number of bits associated with the prime number.

9. The method of claim 1, further comprising:
performing blind decoding of the control message to determine which format of a set of two or more predefined formats is a format used for encoding the control message; and
decoding the control message based at least in part on the format used for encoding the control message.

10. The method of claim 9, wherein the set of two or more predefined formats comprises a first format corresponding to the control message having a first bit length, a second format corresponding to the control message having a second bit length greater than the first bit length, a third format corresponding to the control message having a first scrambling sequence, a fourth format corresponding to the control message having a second scrambling sequence different from the first scrambling sequence.

11. The method of claim 1, further comprising:
receiving a configuration of the group common control channel;
identifying a hashing function based at least in part on the received configuration; and
calculating the first integer value corresponding to the identifier of the UE using the hashing function on a non-integer value that comprises the identifier of the UE.

12. The method of claim 11, wherein the non-integer value comprises a medium access control address, or an international mobile subscriber identity, or any combination thereof.

13. The method of claim 1, wherein the first integer value corresponding to the identifier of the UE comprises a radio network temporary identifier.

14. The method of claim 1, wherein each control information segment of the plurality of control information segments comprises a preconfigured number of bits of control information.

15. A method for wireless communication by a base station, comprising:
generating a control message for a set of user equipments (UEs) from a plurality of UEs, the control message comprising a plurality of control information segments;
selecting a plurality of integer values and a prime number for inclusion in the control message based at least in part on the set of UEs, each integer value of the plurality of integer values being associated with respective control information segments of the plurality of control information segments, wherein the plurality of integer values and the prime number are configured to address each UE of the set of UEs; and
transmitting, to at least the set of UEs, the control message including the plurality of integer values and the prime number, the control message transmitted via a group common control channel.

16. The method of claim 15, wherein selecting the plurality of integer values comprises:
identifying respective integer values corresponding to identifiers of each UE of the set of UEs; and
determining the plurality of integer values based at least in part on the respective integer values corresponding to the identifiers of each UE.

17. The method of claim 16, wherein determining the plurality of integer values comprises:
determining the plurality of integer values based at least in part on respective remainder values from modulo operations being equal to each integer value of the plurality of integer values, the modulo operations including the prime number and the respective integer values corresponding to the identifiers of each UE.

18. The method of claim 16, further comprising:
determining a first integer value corresponding to an identifier of a first UE from the set of UEs, wherein the first integer value is determined based at least in part on a non-integer value of the first UE and a hashing function; and
transmitting a configuration of the group common control channel to the first UE, wherein the configuration indicates the hashing function.

19. The method of claim 15, further comprising:
selecting one or more flag bits that indicate a format of the control message, wherein the control message includes the one or more flag bits.

20. The method of claim 19, further comprising:
identifying one or more prime numbers of a first set of prime numbers, the first set of prime numbers corresponding to a first bit value of the one or more flag bits, wherein selecting the prime number is based at least in part on determining whether the one or more prime numbers from the first set of prime numbers satisfy a rule.

21. The method of claim 20, further comprising:
determining that the one or more prime numbers of the first set of prime numbers do not satisfy the rule; and
identifying one or more additional prime numbers of a second set of prime numbers that is different from the first set of prime numbers, the second set of prime numbers corresponding to a second bit value of the one or more flag bits, wherein selecting the prime number is based at least in part on determining whether the one or more prime numbers from the second set of prime numbers satisfy the rule.

22. The method of claim 21, wherein:
the first set of prime numbers corresponds to a first set of UEs of the plurality of UEs; and
the second set of prime numbers corresponds to a second set of UEs of the plurality of UEs, the second set of UEs having a fewer number of UEs than the first set of UEs.

23. The method of claim 19, wherein:
the one or more flag bits indicate a number of control information segments of the plurality of control information segments, a number of bits associated with the prime number, a number of bits associated with each integer value of the plurality of integer values, or any combination thereof; and
different values of the one or more flag bits indicate different numbers of total bits associated with the control message.

24. The method of claim 23 wherein the number of bits associated with each integer value is based at least in part on the number of bits associated with the prime number.

25. The method of claim 15, wherein selecting the prime number comprises:
selecting an index of the prime number in a prime number sequence, wherein the prime number included in the control message comprises the index of the prime number, wherein the index of the prime number is from a pre-configured table comprising a plurality of prime number indices.

26. The method of claim 15, further comprising:
determining a format for the control message, wherein the format is from a set of two or more predefined formats; and
encoding the control message based at least in part on the format.

27. The method of claim 26, wherein the set of two or more predefined formats comprises a first format corresponding to the control message having a first bit length, a second format corresponding to the control message having a second bit length greater than the first bit length, a third format corresponding to the control message having a first scrambling sequence, a fourth format corresponding to the control message having a second scrambling sequence different from the first scrambling sequence.

28. The method of claim 15, wherein the prime number is selected based on a one-to-one function for the set of UEs.

29. An apparatus for wireless communication by a user equipment (UE), comprising:
a processor;
memory coupled with the processor; and
instructions stored in the memory and executable by the processor to cause the apparatus to:
receive a control message via a group common control channel, the control message comprising a plurality of control information segments for a set of UEs from a plurality of UEs;
identify, within the control message, a prime number and a plurality of integer values, each integer value of the plurality of integer values being associated with respective control information segments of the plurality of control information segments; and
process the prime number, each integer value of the plurality of integer values, and a first integer value corresponding to an identifier of the UE to determine applicability of the control message to the UE.

30. An apparatus for wireless communication by a base station, comprising:
a processor;
memory coupled with the processor; and
instructions stored in the memory and executable by the processor to cause the apparatus to:
generate a control message for a set of user equipments (UEs) from a plurality of UEs, the control message comprising a plurality of control information segments;
select a plurality of integer values and a prime number for inclusion in the control message based at least in part on the set of UEs, each integer value of the plurality of integer values being associated with respective control information segments of the plurality of control information segments, wherein the plurality of integer values and the prime number are configured to address each UE of the set of UEs; and
transmit, to at least the set of UEs, the control message including the plurality of integer values and the prime number, the control message transmitted via a group common control channel.

\* \* \* \* \*